United States Patent
Otomo et al.

(10) Patent No.: US 12,548,668 B2
(45) Date of Patent: Feb. 10, 2026

(54) FUNCTION RECOMMENDATION SYSTEM AND FUNCTION RECOMMENDATION METHOD

(71) Applicant: HITACHI HIGH-TECH CORPORATION, Tokyo (JP)

(72) Inventors: Yuji Otomo, Tokyo (JP); Manabu Andou, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 60 days.

(21) Appl. No.: 18/293,817

(22) PCT Filed: Jun. 14, 2022

(86) PCT No.: PCT/JP2022/023711
§ 371 (c)(1),
(2) Date: Jan. 31, 2024

(87) PCT Pub. No.: WO2023/013250
PCT Pub. Date: Feb. 9, 2023

(65) Prior Publication Data
US 2024/0347187 A1 Oct. 17, 2024

(30) Foreign Application Priority Data

Aug. 4, 2021 (JP) ................................ 2021-128580

(51) Int. Cl.
*G16H 40/40* (2018.01)
*G16H 40/67* (2018.01)

(52) U.S. Cl.
CPC ............. *G16H 40/40* (2018.01); *G16H 40/67* (2018.01)

(58) Field of Classification Search
CPC ........ G16H 40/40; G16H 40/60; G16H 40/00; G16H 40/20
See application file for complete search history.

(56) References Cited

U.S. PATENT DOCUMENTS

| 8,359,095 B2 | 1/2013 | Hedberg et al. |
| 2006/0179023 A1 | 8/2006 | Lau et al. |

(Continued)

FOREIGN PATENT DOCUMENTS

| JP | 2010-529427 A | 8/2010 |
| JP | 2012-032883 A | 2/2012 |

(Continued)

OTHER PUBLICATIONS

Derfus, Gayle E., et al. "Cell culture monitoring via an auto-sampler and an integrated multi-functional off-line analyzer." Biotechnology progress 26.1 (2010): 284-292. (Year: 2010).*

(Continued)

*Primary Examiner* — Jason B Dunham
*Assistant Examiner* — Constantine Siozopoulos
(74) *Attorney, Agent, or Firm* — MATTINGLY & MALUR, PC

(57) ABSTRACT

In the present invention, a useful function suitable for the usages tatus of a medical device is recommended without burdening a user with advanced and complicated work for effectively using various functions installed int the medical device. This function recommendation system, which recommends functions that can be executed by a medical device 102 to a user, comprises an operation information recording unit 103 that stores operation information indicating the usage status of a medical device 102, a function information recording unit 104 that stores function information including usage conditions for recommending functions to be executed by the medical device 102, and a recommended function calculation unit 111 that outputs functions corresponding to the usage conditions as recommended functions on the basis of the operation information and the usage conditions.

13 Claims, 19 Drawing Sheets

(56) References Cited

U.S. PATENT DOCUMENTS

| | | | |
|---|---|---|---|
| 2019/0206003 A1* | 7/2019 | Harris | G16H 20/40 |
| 2021/0182087 A1 | 6/2021 | Park et al. | |
| 2022/0091905 A1 | 3/2022 | Lee et al. | |
| 2022/0249097 A1* | 8/2022 | Shelton, IV | G16H 50/20 |

FOREIGN PATENT DOCUMENTS

| | | | | |
|---|---|---|---|---|
| JP | 2013-042903 A | 3/2013 | | |
| JP | 2014-164599 A | 9/2014 | | |
| JP | 2019-045446 A | 3/2019 | | |
| KR | 20200094829 A | 8/2020 | | |
| WO | 2008150458 A1 | 12/2008 | | |
| WO | WO-2022157696 A1 * | 7/2022 | | A61B 17/3476 |

OTHER PUBLICATIONS

Extended European Search Report received in corresponding European Application No. 22852677.8 dated Jul. 3, 2025.
International Search Report of PCT/JP2022/023711 dated Aug. 16, 2022.

* cited by examiner

OPERATION HISTORY

OPERATION DATE : 2020/10/01

| TIME | OPERATION HISTORY | DEVICE STATUS |
|---|---|---|
| 08:15 | START OF DEVICE | TURNING ON |
| 08:20 | | STANDBY |
| 08:30 | INTRODUCTION OF SAMPLE | |
| 08:30 | START OF ANALYSIS | PREPARATION |
| 08:40 | | ANALYSIS |
| 12:30 | OUTPUT OF ANALYSIS RESULT | |
| 13:00 | | SUSPENSION |
| 13:20 | INTRODUCTION OF SAMPLE | |
| 13:20 | START OF ANALYSIS | PREPARATION |
| 13:30 | | ANALYSIS |
| 16:20 | OUTPUT OF ANALYSIS RESULT | |
| 16:25 | SHUTDOWN OF DEVICE | TURNING OFF |

(b) 202

FUNCTION A

FUNCTION NAME :
　RACK RECEPTION

OPERATION INFORMATION :
　OPERATION HISTORY

USAGE CONDITION :
　[TRANSITION OF DEVICE STATUS]
　PREPARATION TO ANALYSIS
　TWICE OR MORE A DAY

EFFECT :
　REDUCTION IN NUMBER OF TIMES
　THAT OPERATION IS STARTED (c) 203

FUNCTION B

FUNCTION NAME :
　STOP WASHING

OPERATION INFORMATION :
　EVENT HISTORY,
　TEST REQUEST INFORMATION

USAGE CONDITION :
　[EVENT HISTORY]
　REAGENT REPLACEMENT TO
　WASHING OPERATION
　[TEST REQUEST INFORMATION]
　TEST TYPE A TO B

EFFECT :
　REDUCTION IN AMOUNT OF
　WATER CONSUMED

SETTING OF USAGE STATUS REVIEW — 701

711
☑ AUTOMATICALLY EXECUTE REVIEW

EXECUTION TIMING    [AT BEGINNING OF EVERY MONTH ▽] — 712

MEASUREMENT PERIOD    [ONE MONTH ▽] — 713

SETTING OF REPORT ITEMS TO BE DISPLAYED

- ☑ NUMBER OF TESTS
- ☑ NUMBER OF EMERGENCY TESTS
- ☑ NUMBER OF TEST ITEMS
- ☑ AVERAGE OPERATION TIME
- ☑ AVERAGE TAT
- ☑ AVERAGE OPS

714

SETTING OF EVALUATION ITEMS TO BE DISPLAYED

- ☑ OPERATING RATE
- ☑ OPERATION EFFICIENCY
- ☑ NORMAL OPERATION LEVEL
- ☑ ENVIRONMENTAL EFFICIENCY
- ☑ AVERAGE TAT
- ☐ COST-EFFECTIVENESS

715

[CANCEL] — 716    [OK] — 717

(b)

EXECUTION OF USAGE STATUS REVIEW — 702

OPERATION RECORD

MEASUREMENT PERIOD    [2020/10/01] — 721   TO   [2020/10/30] — 722

[CANCEL] — 723    [RUN] — 724

FACILITY A USAGE STATUS REVIEW — 1101, 1102

MEASUREMENT PERIOD
2020/10/01 TO 2020/10/30

──── REPORT ──── 1103

| | |
|---|---|
| NUMBER OF TESTS | ··· 416 TESTS |
| NUMBER OF EMERGENCY TESTS | ··· 27 TESTS |
| NUMBER OF TEST ITEMS | ··· 30 TYPES |
| AVERAGE OPERATION TIME | ··· 6h |
| AVERAGE TAT | ··· 10m |
| AVERAGE OPS | ··· 1.8 TIMES |
| NUMBER OF DAYS AFTER MAXIMUM MAINTENANCE PERIOD IS EXCEEDED | ··· 10 DAYS |
| AVERAGE AMOUNT OF WATER CONSUMED | ··· 10ml |

──── EVALUATION ──── 1104

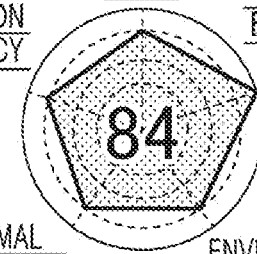

OPERATING RATE
OPERATION EFFICIENCY — TAT EFFICIENCY
84
NORMAL OPERATION LEVEL — ENVIRONMENTAL EFFICIENCY

➡ COMPARE AND CONSIDER SETTINGS — 1105

(b)

SYSTEM SETTING COMPARISON LIST — 1106

| | | OWN FACILITY | FACILITY A | |
|---|---|---|---|---|
| 1108 | ☐ FUNCTION A | ON | ON | CHECK SETTING |
| 1108 | ☑ FUNCTION B | OFF | ON — 1107 | CHECK SETTING |
| 1108 | ☐ FUNCTION C | ON | ON | CHECK SETTING |

➡ CHECK PREDICTION OF APPLICATION OF SELECTED FUNCTION

➡ APPLY SELECTED FUNCTION

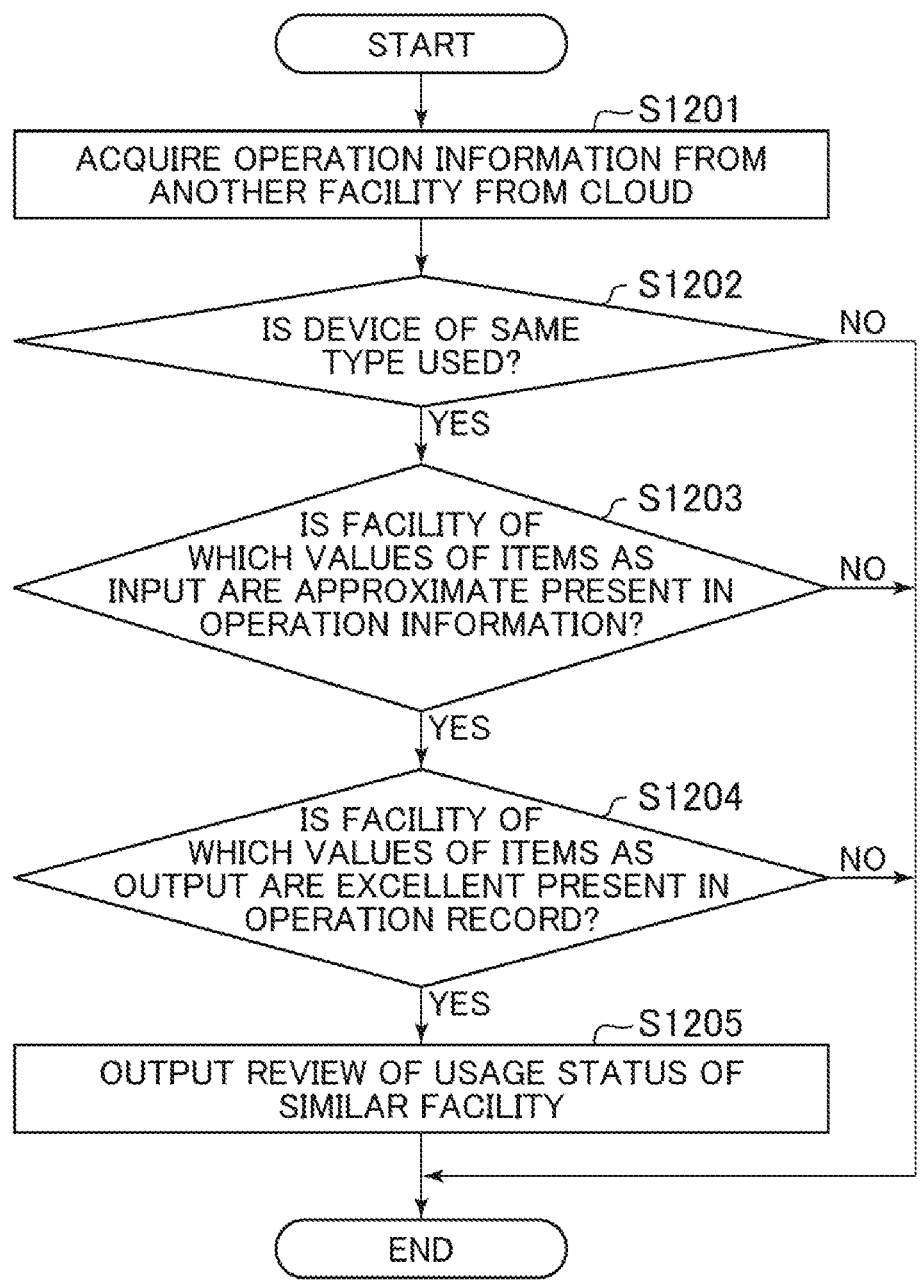

FUNCTION RECOMMENDATION SYSTEM AND FUNCTION RECOMMENDATION METHOD

TECHNICAL FIELD

The present invention relates to a function recommendation system and a function recommendation method that recommend, to a user, a function that can be executed by a medical device.

BACKGROUND ART

As medical devices such as analyzers that perform qualitative and quantitative analysis of biological samples such as blood and urine are highly developed, medical devices tend to have various functions. For example, Patent Literature 1 discloses an analyzer that has a function of displaying, on a display unit, a time zone in which reagents are recommended to be replaced. The analyzer described in Patent Literature 1 tests a sample using a plurality of reagents and has a recording unit that stores a past measurement history. The analyzer described in Patent Literature 1 predicts a usage status on the day based on the past measurement history and displays, based on the predicted usage status on the day and remaining amounts of the plurality of reagents, a time zone in which the reagents are recommended to be replaced.

CITATION LIST

Patent Literature

Patent Literature 1: Japanese Unexamined Patent Application Publication No. 2019-45446

SUMMARY OF INVENTION

Technical Problem

In general, a laboratory technician who uses a medical device such as an analyzer in a hospital or a specialized testing institution usually has little experience using a medical device and uses a medical device for the first time after being assigned to a job in a process of acquiring a qualification. Therefore, a new laboratory technician usually does not know a detailed method of operating a medical device and a function that is effective for a usage status of a facility. It is possible to collect information through an operation manual for a medical device, training, a user meeting, or the like. However, operation manuals are often large in volume, and it takes time and effort to collect information from the operation manuals. In addition, a person may not be able to participate in the training and the user meeting since locations where the training and the user meeting are held may be far as geographical constraints, or it may not be possible to secure time during the events as time constraints. In addition, even when a new function is released, a user may continue to follow an existing usage method and may not be able to effectively use the new function.

The present invention provides a technique of recommending a useful function suitable for a usage status of a medical device without burdening a user with advanced and complicated work for effectively using various functions installed in the medical device.

Solution to Problem

The present invention provides a function recommendation system that recommends, to a user, a function that can be executed by a medical device, and includes an operation information recording unit that stores operation information indicating an operation status of the medical device, a function information recording unit that stores function information including a usage condition for recommending a function to be executed by the medical device, and a recommended function calculation unit that outputs a function corresponding to the usage condition as a recommended function based on the operation information and the usage condition.

Advantageous Effects of Invention

According to the present invention, it is possible to recommend a useful function suitable for a usage status of a medical device without burdening a user with advanced and complicated work for effectively using various functions installed in the medical device.

BRIEF DESCRIPTION OF DRAWINGS

FIG. 2 are diagrams illustrating operation information and function information.

FIG. 5 illustrate a setting screen for setting a condition for calculating a recommended function, and the like.

FIG. 7 illustrate a setting screen for setting a condition for calculating a review of a usage status of the medical device, and the like.

FIG. 8 illustrate a screen indicating a review of a usage status of the medical device, and the like.

FIG. 11 illustrate a screen indicating a review of a usage status of a medical device of another facility.

FIG. 12 illustrates a process procedure to be executed by a similar facility calculation unit.

DESCRIPTION OF EMBODIMENTS

Figure 1A:
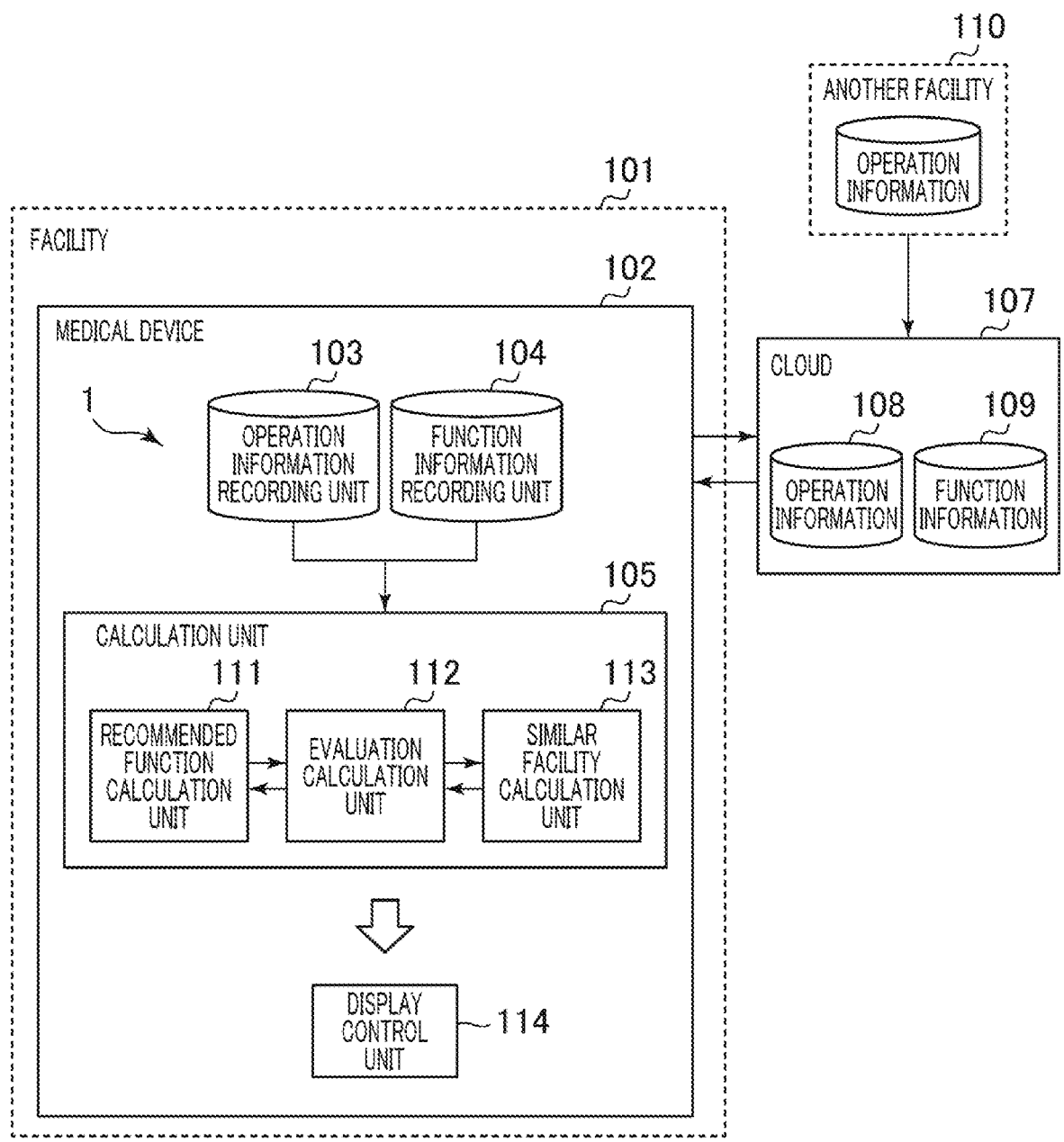
FIG. 1A is a diagram illustrating an overall configuration of a function recommendation system according to Example 1.

Embodiments of the present invention are described in detail with reference to the drawings. It goes without saying that, in the following embodiments, components (including elemental steps and the like) are not necessarily essential, except in cases where the components are specifically specified and where the components are clearly considered essential in principle.

Example 1

A medical device 102 according to Example 1 includes a function recommendation system 1. In a facility 101, one or a plurality of medical devices 102 are installed. The medical device 102 is communicably connected to a cloud 107 via a network. The cloud 107 is communicably connected to one or a plurality of medical devices installed in another facility 110 via the network.

Medical Device

The medical device 102 is a medical device such as an analyzer that analyzes a sample or a processing device that performs pre-treatment and post-treatment on a sample. The medical device 102 is not limited to the analyzer and the processing device as long as the medical device 102 is a medical device. That is, a medical device according to the present invention is a device intended for diagnosis, treatment, or prevention on humans or animals. For example, the medical devices 102 include various devices such as X-ray computed tomography (CT), magnetic resonance imaging (MRI), a pacemaker, an artificial dialysis device, and an endoscope.

The function recommendation system 1 of the medical device 102 includes an operation information recording unit 103, a function information recording unit 104, a calculation unit 105, and a display control unit 114. The operation information recording unit 103 records operation information indicating an operation status of the medical device 102. Specifically, the operation information recording unit 103 records operation information 201 such as a usage history of a consumable (reagent or the like) used by the medical device 102, test request information indicating a detail of a request for a test to be performed by the medical device 102, a result of the test performed by the medical device 102, a turnaround time required for the test performed by the medical device 102, an operation history of the medical device 102, an event history of an event that occurred in the medical device 102, an alarm history of an alarm that occurred in the medical device 102, system setting information of the medical device 102, an operating time of the medical device 102, a replacement timing and a usage time of a component of the medical device 102, and amounts of water and electricity consumed by the medical device 102.

FIG. 2 are diagrams illustrating the operation information of the medical device. FIG. 2(a) illustrates the operation information of the medical device 102 recorded by the operation information recording unit 103. FIG. 2(a) only illustrates an operation history of the medical device 102 that is included in the operation information 201. The operation history of the medical device 102 includes a time when the medical device 102 is operated, details of the operation history, and a status of the medical device 102 that are stored for each operation date in time-series. FIGS. 2(b) and 2(c) are diagrams illustrating function information 202 and 203 stored by the function information recording unit 104. The function information 202 and 203 is information relating to functions for improving the efficiency of use of the medical device 102. The function information 202 and 203 includes function names, operation information, usage conditions, and effects. The function names indicate names of the functions. The operation information indicates types of operation information required to recommend the functions. The usage conditions are conditions for recommending the functions. The usage conditions are conditions relating to operation information (operation history in FIG. 2(b) and event history and test request information in FIG. 2(c)) of types indicated by the operation information.

The function information 202 is information relating to a rack reception function and is presented as a recommended function to a user when the operation history satisfies the usage condition. Specifically, when a device status of the operation history transitions from "preparation" to "analysis" twice or more a day, the rack reception function is presented as a recommended function to the user. An effect of the rack reception function is a reduction in the number of times that an operation is started. In addition, the function information 203 is information relating to a stop washing function and is presented as a recommended function to the user when the event history and the test request information satisfy the usage condition. Specifically, when the event history changes from "reagent replacement" to "washing operation", and the test request information changes from a test type "A" to a test type "B", the stop washing function is presented as a recommended function to the user.

As illustrated in FIG. 1A, the calculation unit 105 includes a recommended function calculation unit 111, an evaluation calculation unit 112, and a similar facility calculation unit 113. The recommended function calculation unit 111 calculates, as a recommended function, a function that improves the efficiency of use of the medical device 102, based on the operation information recorded by the operation information recording unit 103 and the function information recorded by the function information recording unit 104. Therefore, it is possible to recommend, to the user, a useful function suitable for the usage status of the medical device 102 without burdening the user with advanced and complicated work for effectively using various functions installed in the medical device 102.

The evaluation calculation unit 112 calculates a review of the current usage status of the medical device 102 based on the operation information recorded by the operation information recording unit 103. Therefore, a laboratory technician or the like can check an evaluation of the current usage status of the medical device 102. In addition, the evaluation calculation unit 112 calculates, based on a function recommended by the recommended function calculation unit 111 and the operation information recorded by the operation information recording unit 103, a prediction review of the usage status when it is assumed that the recommended function is used. Therefore, the laboratory technician or the like can check the prediction of the evaluation of the usage status of the medical device 102 when the recommended function is used. The evaluation calculation unit 112 presents, to the user, the calculated review of the usage status and the prediction review of the usage status by using a graph and numerical values.

The similar facility calculation unit 113 calculates a review of a usage status of a similar facility in order to objectively easily understand the review of the usage status calculated by the evaluation calculation unit 112. The similar facility calculation unit 113 compares the review of the usage status calculated by the evaluation calculation unit 112 with the review of the usage status of the other facility, and outputs a result of the comparison. The similar facility calculation unit 113 may calculate a review of a usage status of a medical device in a similar facility, and may calculate a review of a usage status of a similar facility that summarizes a plurality of medical devices in the other facility. In addition, the similar facility calculation unit 113 may not compare the review of the usage status calculated by the evaluation calculation unit 112 and may independently calculate the review of the usage status of the similar facility. Since the function recommendation system 1 includes the similar facility calculation unit 113, the laboratory technician or the like can check the reviews of the usage statuses of the other medical device and the similar facility, in addition to the medical device 102.

The display control unit 114 displays the results of the calculation by the calculation unit 105 on a display unit 340 of the medical device 102. The laboratory technician or the like can check the results displayed on the display unit 340 and determine whether to apply the recommended function to the medical device 102.

Figure 3:
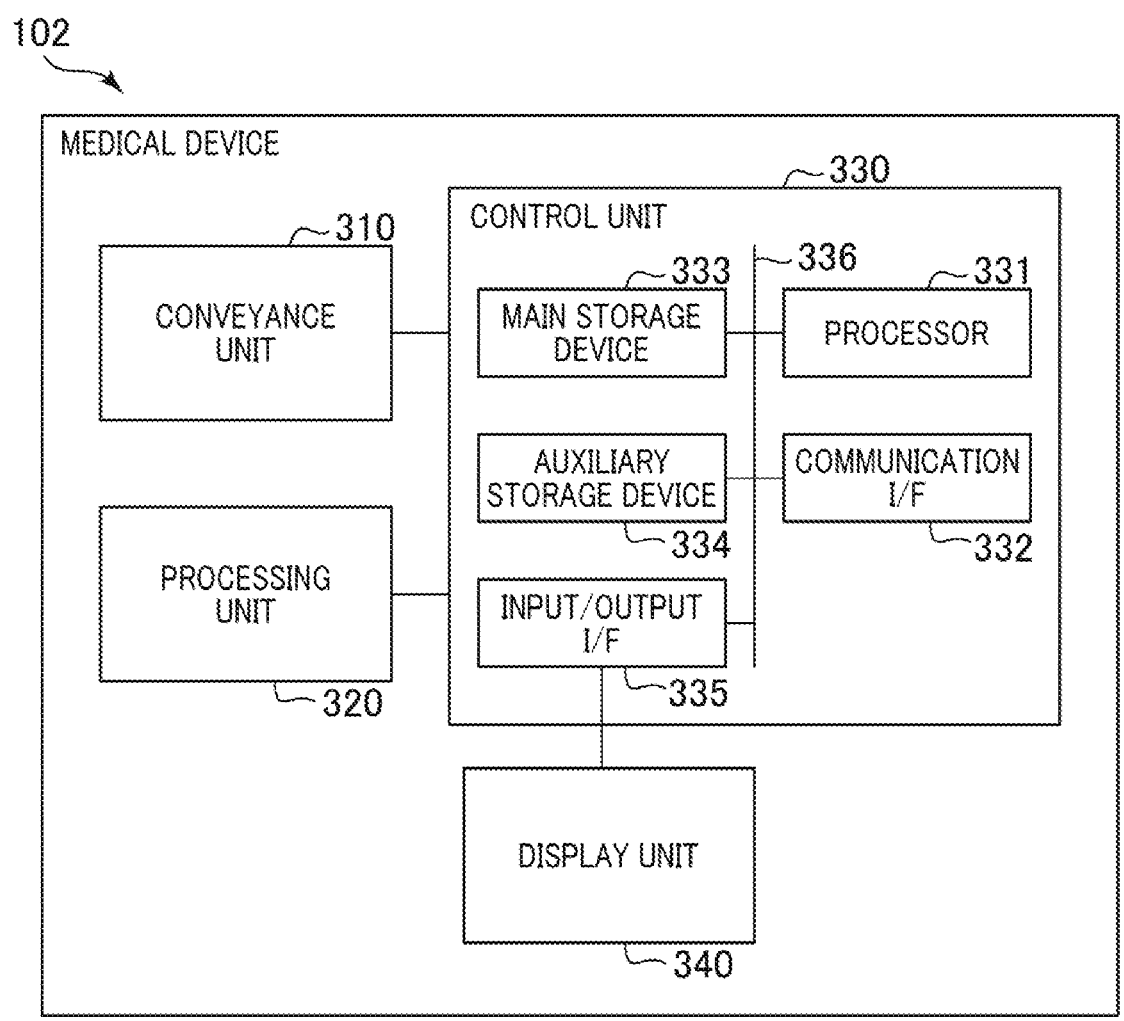
FIG. 3 is a block diagram illustrating a hardware configuration of a medical device.

Next, a hardware configuration of the medical device 102 according to Example 1 is described. FIG. 3 is a diagram illustrating the hardware configuration of the medical device according to Example 1. The medical device 102 according to Example 1 includes a conveyance unit 310, a processing unit 320, a control unit 330, and the display unit 340. The conveyance unit 310 has a function of conveying a sample such as blood, a spinal fluid, or urine, and a reagent to a predetermined position. The processing unit 320 collects the sample conveyed by the conveyance unit 310 and dispenses the sample into a reaction container. In addition, the processing unit 320 collects the reagent conveyed by the conveyance unit 310 and dispenses the reagent into the reaction container. Furthermore, the processing unit 320 stirs the sample and the reagent in the reaction container and irradiates a stirred reaction solution in the reaction container with light. The light with which the reaction solution is irradiated is measured by a photometer and is output to the control unit 330. The display unit 340 includes a liquid crystal display unit and a touch sensor that receives an operation of the laboratory technician or the like, and displays the results of the calculation by the calculation unit 105.

The control unit 330 includes a processor 331, a communication interface 332 (an interface is hereinafter abbreviated to I/F), a main storage device 333, an auxiliary storage device 334, an input/output I/F 335, and a bus 336 via which the above-described modules are communicably connected. The display unit 340 is connected to the input/output I/F 335.

The processor 331 is a central processing unit that controls an operation of each component of the medical device 102. The processor 331 is, for example, a central processing unit (CPU), a digital signal processor (DSP), an application specific integrated circuit (ASIC), or the like. The processor 331 develops a program stored in the auxiliary storage device 334 into a work region of the main storage device 333 such that the program is executable. The main storage device 333 stores the program to be executed by the processor 331, data to be processed by the processor, and the like. The main storage device 333 is a flash memory, a random access memory (RAM), a read only memory (ROM), or the like. The auxiliary storage device 334 stores various programs and various data. The auxiliary storage device 334 stores, for example, an operating system (OS), various programs, various tables, and the like. The auxiliary storage device 334 is a silicon disk including a nonvolatile semiconductor memory (flash memory, erasable programmable ROM (EPROM)), a solid state drive device, a hard disk drive (HDD), or the like.

The communication I/F 332 is an interface for communicably connecting the medical device 102 to the cloud 107 via a network. The input/output I/F 335 receives an operation instruction or the like from a user who operates an input device connected to the input/output I/F 335. The input device is, for example, a keyboard, a touch panel, a mouse, a microphone, or the like. In addition, the input/output I/F 335 can be connected to, for example, the display unit 340 such as an LCD, an electroluminescence (EL) panel, or an organic EL panel, and an output device such as a printer or a speaker. The input/output I/F 335 outputs, to the output device, data and information processed by the processor 331 and data and information stored in the main storage device 333 and the auxiliary storage device 334.

The control unit 330 that includes the processor 331 and the main storage device 333 executes the program to function as the operation information recording unit 103, the function information recording unit 104, the calculation unit 105, and the display control unit 114 described above. The operation information recording unit 103, the function information recording unit 104, the recommended function calculation unit 111, the evaluation calculation unit 112, the similar facility calculation unit 113, and the display control unit 114 according to Example 1 are software modules, but may be hardware modules such as ASICs. In addition, some of the operation information recording unit 103, the function information recording unit 104, the recommended function calculation unit 111, the evaluation calculation unit 112, the similar facility calculation unit 113, and the display control unit 114 may be software modules, and the other units may be hardware modules.

Cloud

The cloud 107 collects and stores operation information 108 and function information 109 of the medical device of another facility 110 connected to the cloud 107. The medical device of another facility 110 may transmit the operation information 108 and the function information 109 to the cloud 107 in accordance with a request from the cloud 107 or may spontaneously transmit the operation information 108 and the function information 109 to the cloud 107. In addition, since the medical device 102 of the facility 101 is communicably connected to the cloud 107, the medical device 102 can acquire, from the cloud 107 via the network, new function information included in the cloud 107 and not included in the medical device 102 as a function to be recommended to the user. The cloud 107 is an external device. Then, the medical device 102 can recommend, to the laboratory technician or the like, the new function acquired from the cloud 107. In addition, the medical device 102 can update the function information recorded by the function information recording unit 104 and add the new function by using distribution information distributed from the cloud 107.

Figure 4:
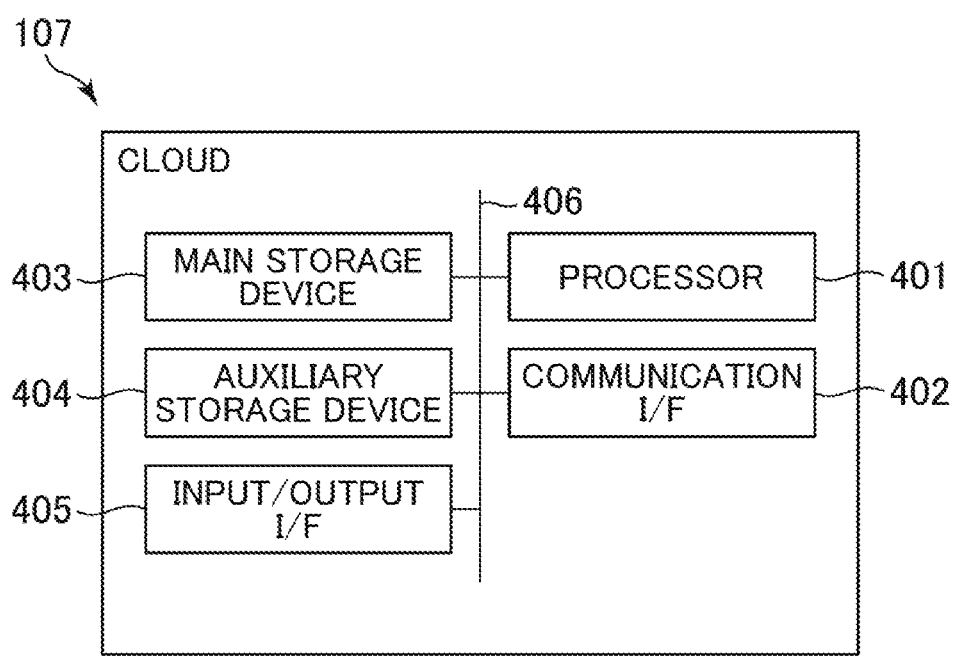
FIG. 4 is a block diagram illustrating a hardware configuration of a cloud.

As illustrated in FIG. 4, the cloud 107 includes a processor 401, a communication I/F 402, a main storage device 403, an auxiliary storage device 404, an input/output I/F 405, and a bus 406 via which the above-described modules are communicably connected. The cloud 107 may be a computer such as a single server or may be implemented by coordination of computers such as a plurality of servers.

The processor 401 is a central processing unit that controls an operation of each unit of the cloud 107. The processor 401 is a central processing unit (CPU), a digital signal processor (DSP), an application specific integrated circuit (ASIC), or the like. The processor 401 develops a program stored in the auxiliary storage device 404 into a work region of the main storage device 403 such that the program is executable. The main storage device 403 stores the program to be executed by the processor 401, data to be processed by the processor 401, and the like. The main storage device 403 is a flash memory, a random access memory (RAM), a read only memory (ROM), or the like. The auxiliary storage device 404 stores various programs and various data. The auxiliary storage device 404 stores an operating system (OS), various programs, various tables, and the like. The auxiliary storage device 404 is a silicon disk including a nonvolatile semiconductor memory (flash memory, erasable programmable ROM (EPROM)), a solid state drive device, a hard disk drive (HDD), or the like.

The communication I/F 402 is an interface for communicably connecting the cloud 107 to the medical device 102 and the medical device of another facility 110 via the network. The input/output I/F 405 receives an operation instruction or the like from an operator of the cloud 107 who operates an input device connected to the input/output I/F 405. The input device is, for example, a keyboard, a touch panel, a mouse, a microphone, or the like. In addition, the input/output I/F 405 can be connected to, for example, a display device such as an LCD, an electroluminescence (EL) panel, or an organic EL panel, and an output device such as a printer or a speaker. The input/output I/F 405 outputs, to the output device, data and information processed by the processor 401 and data and information stored in the main storage device 403 and the auxiliary storage device 404.

Method of Calculating Recommended Function

Figure 5:
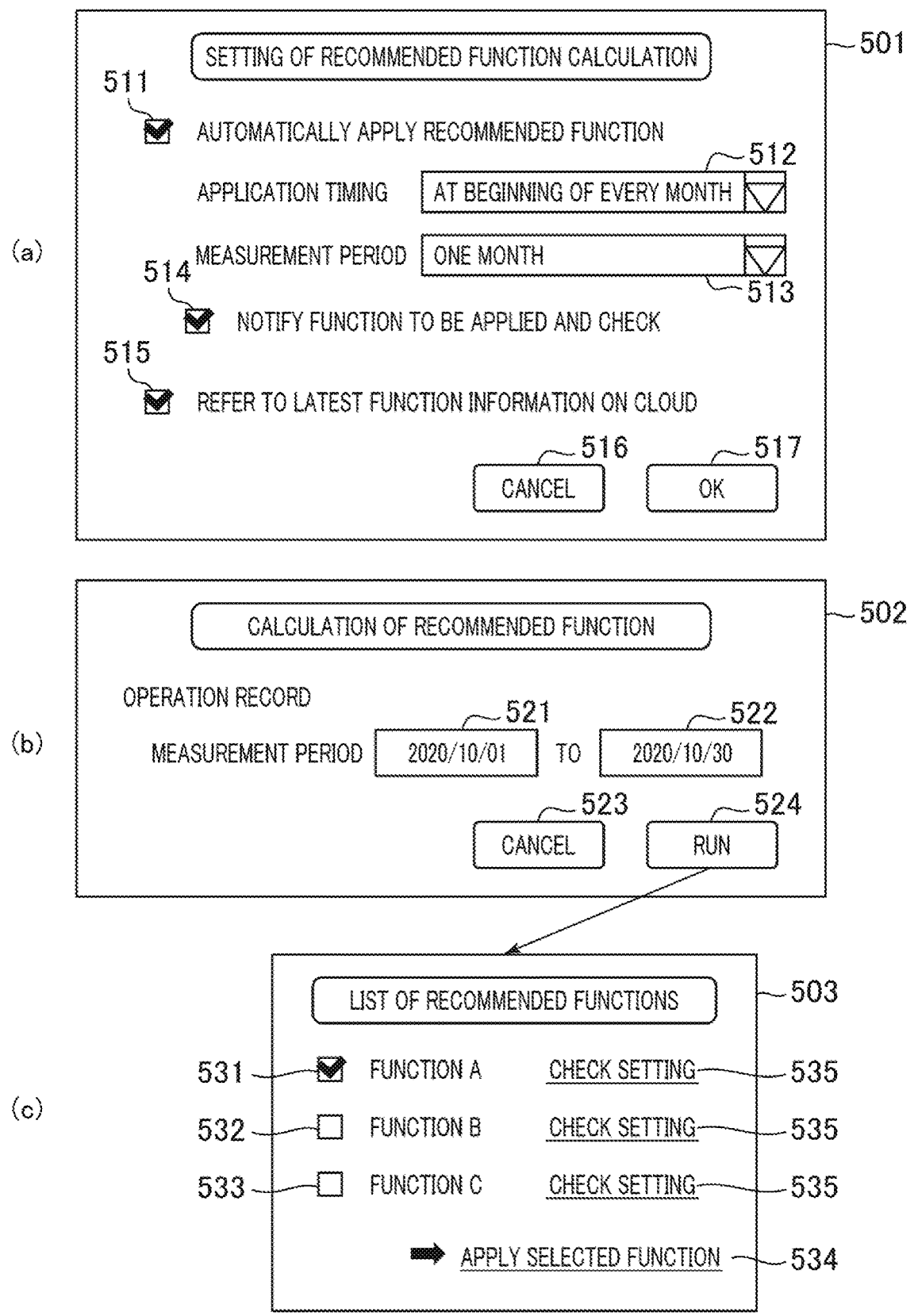
Figure 6:
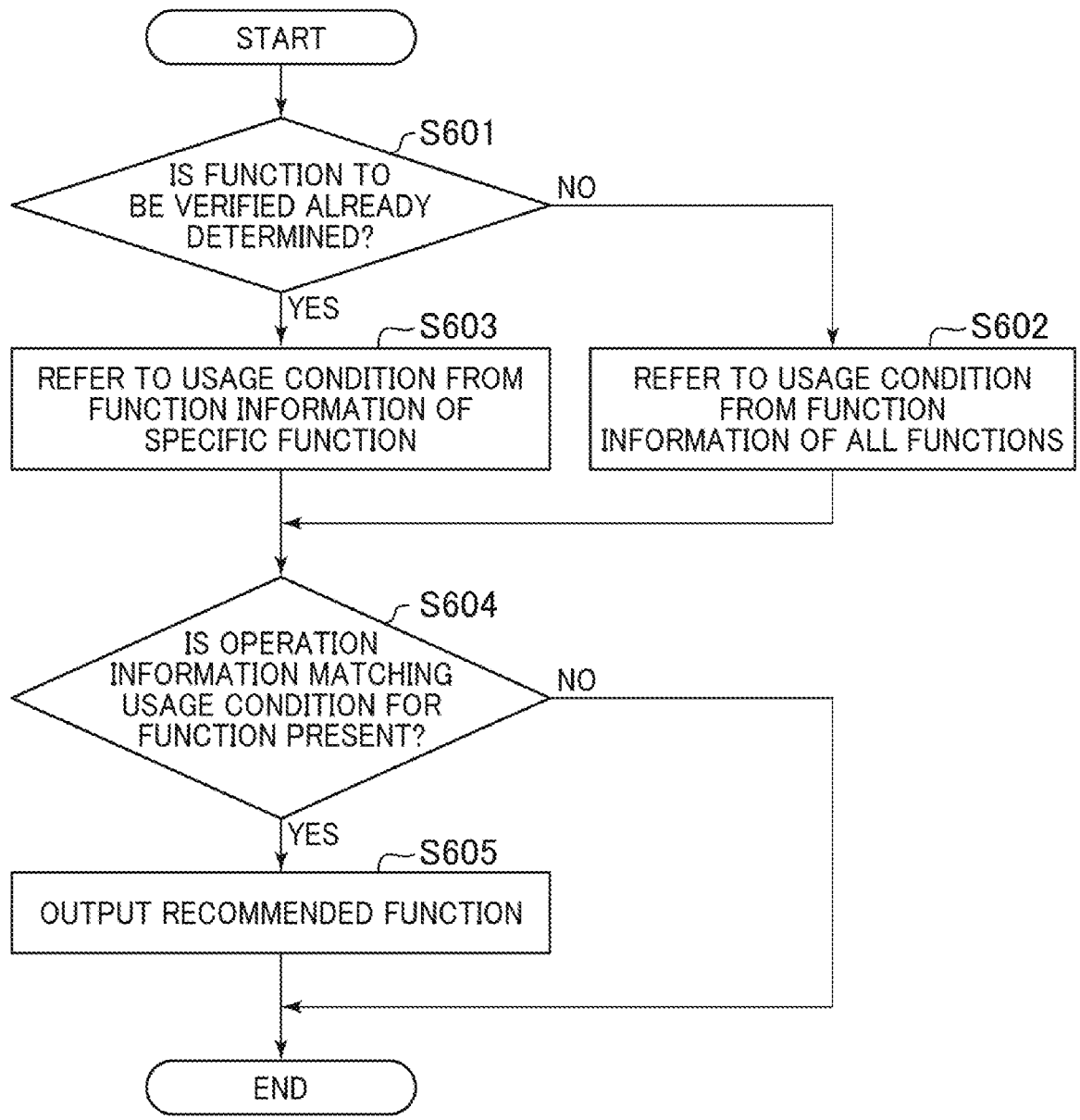
FIG. 6 illustrates a process procedure to be executed by a recommended function calculation unit.

A method of presenting a function recommended to the user among a plurality of functions included in the medical device 102 is described with reference to FIGS. 5 and 6. FIG. 5 illustrate a setting screen for setting a condition for calculating a recommended function, and the like. FIG. 6 illustrates a process procedure to be executed by the recommended function calculation unit.

As illustrated in FIG. 5(*a*), the user can set a condition for calculating a recommended function via an input/output device of the medical device 102 in advance. The setting screen 501 illustrated in FIG. 5(*a*) includes a checkbox 511 for setting whether to automatically apply a recommended function, a pulldown menu 512 for setting a timing of calculating a recommended function, and a pulldown menu 513 for setting a range of the operation information 201. For example, when "at the beginning of every month" is set in the pulldown menu 512, and "one month" is set in the pulldown menu 513, it is possible to automatically calculate a recommended function based on operation information 201 for one previous month at the beginning of every month.

In addition, the setting screen 501 includes a checkbox 514 for setting whether to enable a function of notifying that a recommended function is applied, and a checkbox 515 for setting whether to refer to function information on the cloud 107. In addition, the setting screen 501 includes a Cancel button 516 for canceling reflection of setting of a range of the setting screen 501, and an OK button 517 for determining the setting of the range of the setting screen 501.

The user can set a range of the operation information 201 to be used to calculate a recommended function via the input/output device of the medical device 102. As illustrated in FIG. 5(*b*), the user can set the range of the operation information 201 in detail. A setting screen 502 illustrated in FIG. 5(*b*) includes an input box 521 for setting the beginning of the range of the operation information 201 for recommendation of a function and an input box 522 for setting the end of the range of the operation information 201. In addition, the setting screen 502 includes a Cancel button 523 for canceling the setting of the range of the operation information 201 and a Run button 524 for determining the setting of the range of the operation information 201. The process procedure illustrated in FIG. 6 is started in accordance with selection of the Run button 524 illustrated in FIG. 5(*b*).

As illustrated in FIG. 5(C), one or a plurality of recommended functions calculated by the recommended function calculation unit 111 are displayed on a list screen 503. The list screen 503 includes checkboxes 531, 532, and 533 provided for each recommended function. When "Apply a selected function" 534 is selected in a state in which any or all of the checkboxes 531 to 533 are checked, a checked function is applied to the medical device 102. In a state in which the checkbox 511 is checked, even when "Apply a selected function" 534 is not selected, a recommended function is automatically applied to the medical device 102. In the list screen 503, a link 535 for checking a detail of a recommended function is provided.

Next, the process procedure to be executed by the recommended function calculation unit 111 is described with reference to FIG. 6. This process procedure represents a function recommendation method. The user can select whether to verify only a specific function or verify all functions. In a case where only the specific function is to be verified, it is possible to calculate whether to recommend the specific function within a short time.

The recommended function calculation unit 111 checks whether a function to be verified is already determined (S601). In a case where the function to be verified is not determined (S601: No), the recommended function calculation unit 111 refers to usage conditions of function information of all functions stored by the function information recording unit 104 (S602). In a case where the function to be verified is already determined (S601: Yes), the recommended function calculation unit 111 refers to a usage condition of function information of the specific function (S603). In addition, when the medical device 102 is connected to the cloud 107, the recommended function calculation unit 111 can refer to, from the cloud 107, a usage condition of function information of a new function that is not stored in the medical device 102.

The recommended function calculation unit 111 cross-checks the usage condition referred to in S602 or S603 with the operation information 201 recorded by the operation information recording unit 103 (S604). In this case, a range of the operation information 201 to be referred to can be set in detail on the screen illustrated in FIG. 5(*b*) or can be set to a regular time period on the screen illustrated in FIG. 5(*a*).

In a case where operation information 201 matching the usage condition referred to is present (S604: Yes), the recommended function calculation unit 111 outputs, as a recommended function, a function corresponding to the usage condition matching the operation information 201 (S605). The recommended function calculated by the recommended function calculation unit 111 is displayed on the display unit 340 as illustrated in FIG. 5(*c*). In a case where the usage condition matching the operation information 201 is not present (S604: No), the process is ended.

The process procedure illustrated in FIG. 6 may be started in accordance with an instruction of the user or may be started at a timing selected from the pulldown menu 512 illustrated in FIG. 5(*a*). When a regular timing is selected from the pulldown menu 512, it is possible to periodically automatically calculate a recommended function. In addition, when a new function is added to the medical device 102, whether the added new function is a recommendable environment may be calculated based on the operation information 201, and an automatically or manually recommended new function may be adapted to the medical device 102.

Next, a case where the rack reception function is recommended is specifically described with reference to the process procedure illustrated in FIG. 6. First, the rack reception function is described. The rack reception function includes, as parameters, an arbitrarily settable threshold time and enabling/disabling of the function. When a time period for which the medical device 102 is continuously in a standby state is within the set threshold time, it is possible to prohibit the medical device 102 from being changed from the standby state to a suspended state. When the medical device 102 is continuously in the standby state for a predetermined time period, the medical device 102 automatically shifts to the suspended state to reduce consumption of energy. When a sample is introduced after the medical device 102 becomes the suspended state, the medical device 102 starts an operation and performs a preparation operation. Therefore, it takes time and effort to measure the sample due to the preparation operation.

When the rack reception function is enabled, the time is within the threshold time set after the medical device 102 shifts to the standby state, and a sample is introduced in an intermittent manner, it is possible to prohibit the medical device 102 from shifting to the suspended state. Therefore, it is possible to prevent the preparation operation from being performed every time a sample is introduced.

As illustrated in FIGS. 2, when the device status of the operation history transitions from "preparation" to "analysis" twice or more a day in the function information 202 relating to the rack reception function, the rack reception function is presented as a recommended function to the user.

In the process procedure illustrated in FIG. 6, in both cases where the answer is Yes in S601 and where the answer is No in S601, the recommended function calculation unit 111 refers to a usage condition from the function information 202 of the rack reception function (S602, S603). The usage condition of the function information 202 is that the device status of the operation history transitions from "preparation" to "analysis" twice or more a day. Next, the recommended function calculation unit 111 crosschecks the usage condition referred to in S602 or S603 with the operation information (operation history in this case (see FIG. 2(*b*)) recorded by the operation information recording unit 103 (S604). As illustrated in FIG. 2(*a*), since the operation history of the operation information 201 indicates that the status of the medical device 102 is analysis changed from preparation in a time period of 8:30 to 8:40 and a time period of 13:20 to 13:30, the operation information 201 matches the usage condition for the rack reception function (S604). In a case where the operation information 201 matches the usage condition, and the rack reception function is used, the usage status of the medical device 102 is improved. Therefore, the recommended function calculation unit 111 outputs the rack reception function as a recommended function (S605).

Since the rack reception function has the threshold time as a parameter, the user may be prompted to set the threshold time when the rack reception function is recommended.

In Example 1, it is possible to recommend a function other than the rack reception function. For example, the recommended function calculation unit 111 can recommend the stop washing function illustrated in FIG. 2(*c*). The stop washing function is a function of suppressing a cell washing operation in a time period between specified test items. Normally, the cell washing operation is performed in order to prevent carry-over in the time period between the test items, but it is desirable to suppress the cell washing operation and suppress the amount of water to be used and the amount of a washing agent to be used, except for a specific situation in which carry-over easily occurs. When the stop washing function is used, it is possible to suppress the cell washing operation in the time period between the specified test items. The recommended function calculation unit 111 crosschecks the event history and test request information of the operation information 201 with the usage condition for the stop washing function (S602, S603). In a case where the operation information 201 matches the usage condition for the stop washing function (S604: Yes), the recommended function calculation unit 111 outputs the stop washing function as a recommended function (S605).

Review of Usage Status

The medical device 102 according to Example 1 can present a review of the usage status of the medical device 102 to the user. In addition, the medical device 102 according to Example 1 can present a difference between reviews before and after the application of a recommended function. Therefore, the user can check the presented review and consider whether to apply the recommended function to the medical device 102.

Figure 8:
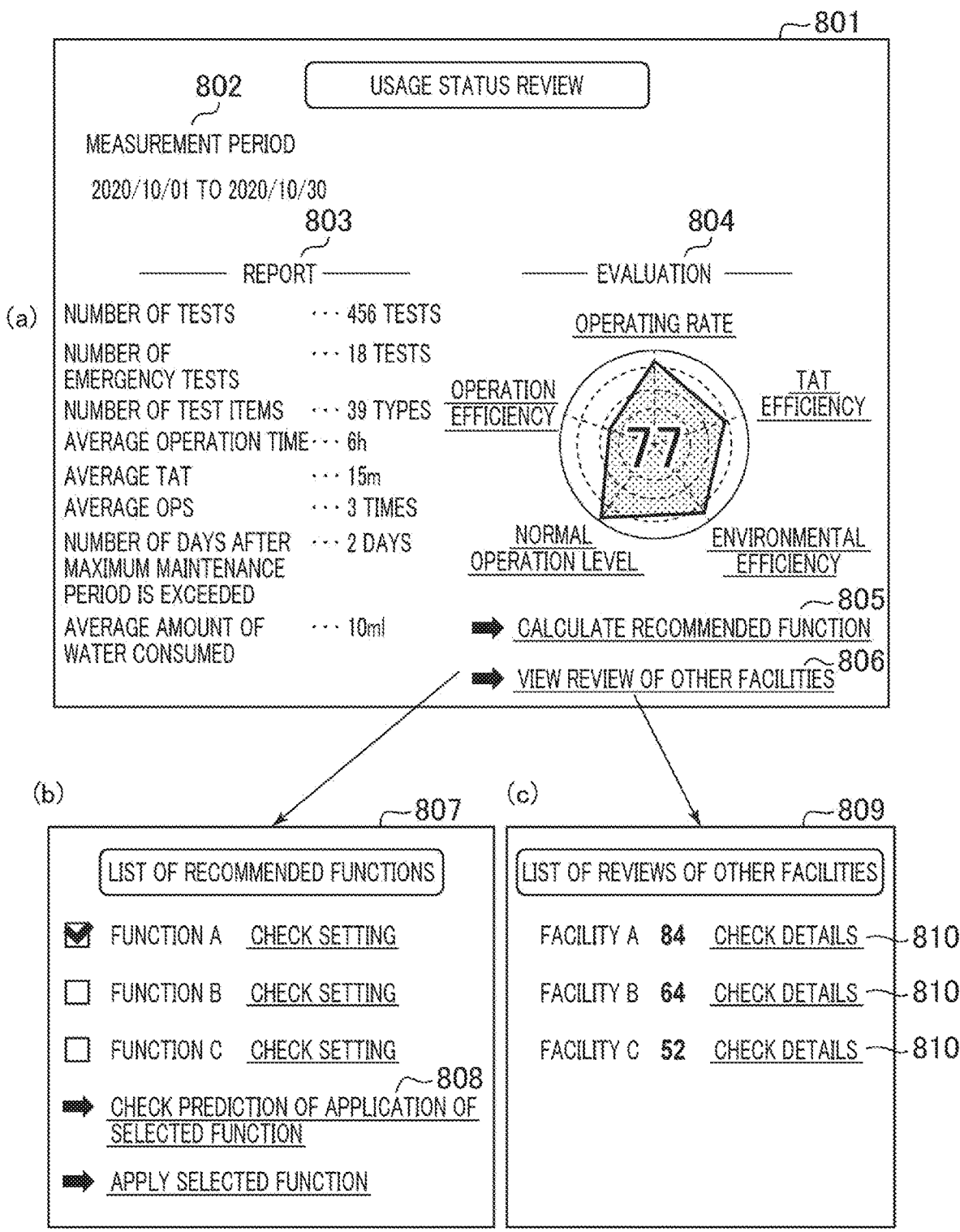
Figure 9:
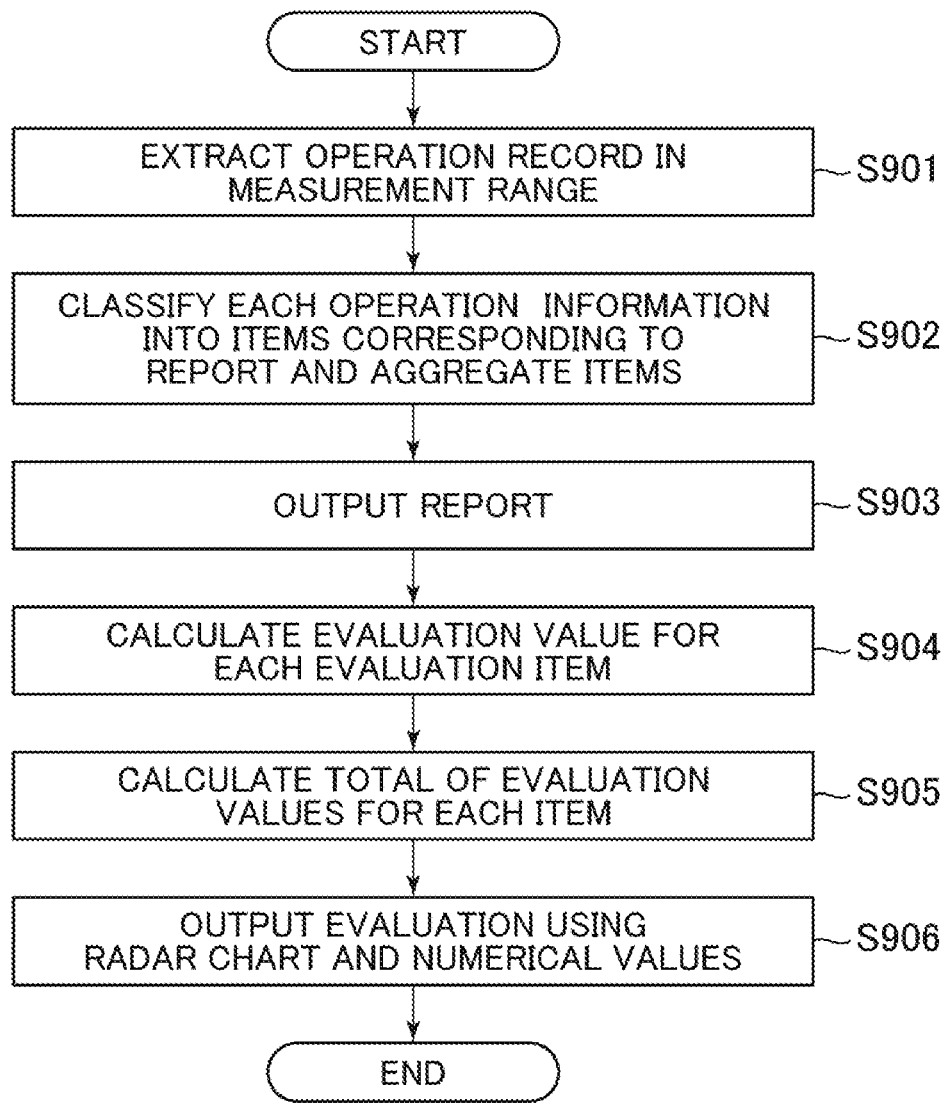
FIG. 9 illustrates a process procedure to be executed by an evaluation calculation unit.

FIG. 7 illustrate a setting screen for setting a condition for calculating a review of the usage status of the medical device, and the like. FIG. 8 illustrate a screen indicating a review of the usage status of the medical device, and the like. FIG. 9 illustrates a process procedure to be executed by the evaluation calculation unit.

As illustrated in FIG. 7(*a*), the user can set a condition for calculating the review of the usage status via an input device of the medical device 102. The setting screen 701 illustrated in FIG. 7(*a*) includes a checkbox 711 for setting whether to automatically calculate a review of the usage status, a pulldown menu 712 for setting a timing of calculating a review of the usage status, and a pulldown menu 713 for setting a range of the operation information 201. For example, when "at the beginning of every month" is set in the pulldown menu 712, and "one month" is set in the pulldown menu 713, it is possible to automatically calculate a review of the usage status based on operation information 201 for one previous month at the beginning of every month.

In addition, the setting screen 701 includes a region 714 for setting report items to be displayed as a review of the usage status, and a region 715 for setting evaluation items to be displayed as a review of the usage status. Furthermore, the setting screen 701 includes a Cancel button 716 for canceling reflection of setting of a range of the setting screen 701, and an OK button 717 for determining setting of the range of the setting screen 701.

The user can set the range of the operation information 201 to be used to calculate a review of the usage status via the input/output device of the medical device 102. As illustrated in FIG. 7(*b*), the user can set the range of the operation information 201 in detail. A setting screen 702 illustrated in FIG. 7(*b*) includes an input box 721 for setting the beginning of the range of the operation information 201 for calculation of a review of the usage status, and an input box 722 for setting the end of the range of the operation information 201. In addition, the setting screen 702 includes a Cancel button 723 for canceling setting of the range of the operation information 201, and a Run button 724 for determining setting of the range of the operation information 201.

The process procedure illustrated in FIG. 9 is executed in accordance with selection of the Run button 724 illustrated in FIG. 7(b).

FIG. 8(a) illustrates a review screen indicating a review of the usage status. FIG. 8(b) illustrates a list screen indicating a list of recommended functions. FIG. 8(c) illustrates a different facility review screen indicating a list of reviews of a usage status of other facilities.

The evaluation calculation unit 112 calculates a review of the usage status of the medical device 102 based on operation information 201 in a specified range. The review screen 801 illustrated in FIG. 8(a) includes a time period display region 802 for displaying the specified range of the operation information 201, a report 803 indicating a detail of an operation of the medical device 102 for set report items, and an evaluation 804 for displaying an evaluation calculated by the evaluation calculation unit 112 based on the operation information 201 using a graphical radar chart. In addition, the review screen 801 includes a link 805 for viewing a function recommended by the recommended function calculation unit 111, and a link 806 for viewing reviews of the other facilities provided by the similar facility calculation unit 113.

Figure 10:
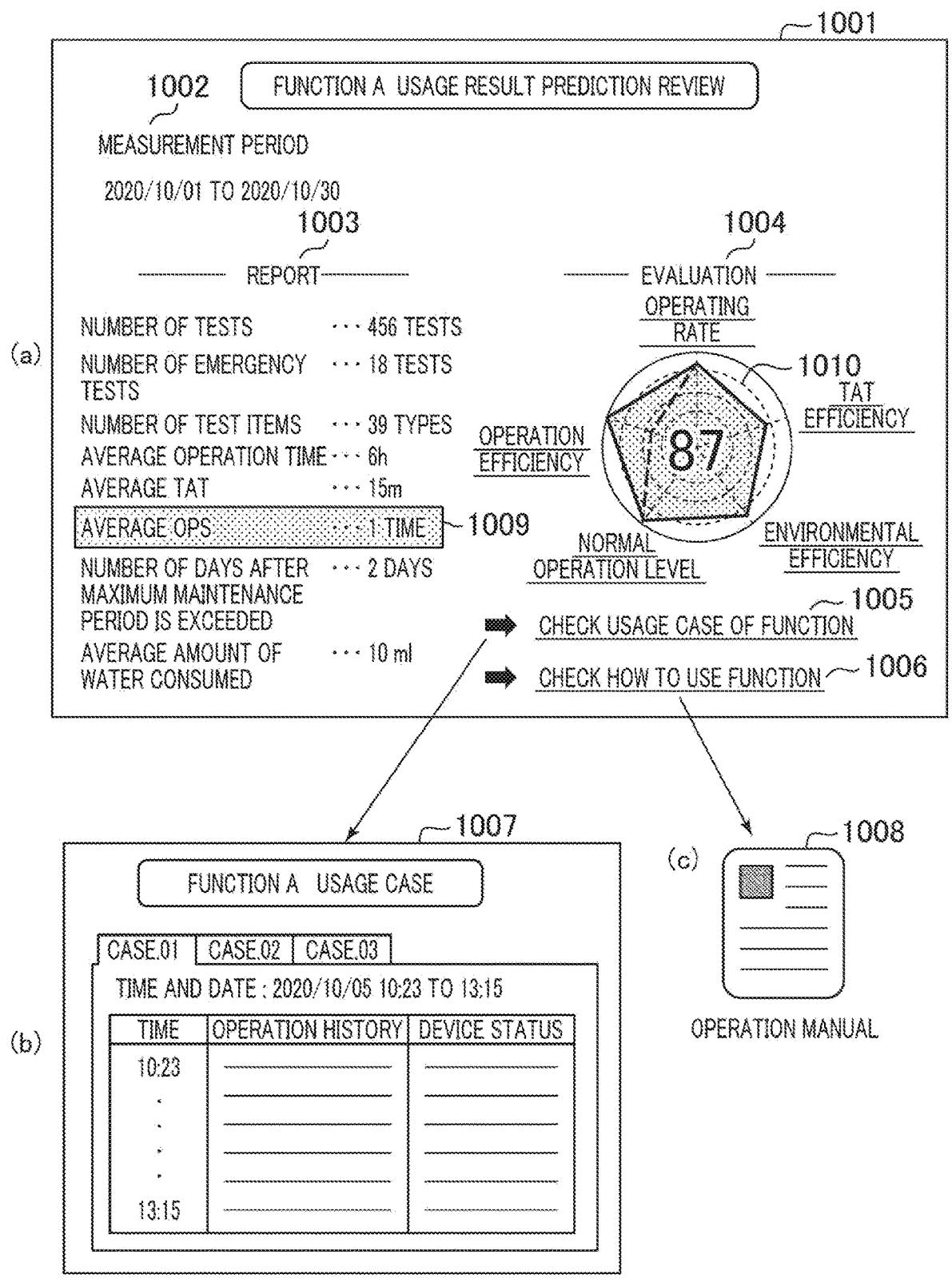
FIG. 10 illustrate a screen indicating a prediction review of a usage status of the medical device to which a recommended function is applied.

When the link 805 is selected, the list screen 807 illustrated in FIG. 8(b) is displayed. When the link 806 is selected, the different facility review screen 809 illustrated in FIG. 8(c) is displayed. Parts of the list screen 807 that are common to the list screen 503 will not be described. The list screen 807 includes a link 808 for checking an evaluation when a recommended function is applied. In addition, it is possible to apply a function selected on the list screen 807 to the medical device 102. When the link 808 is selected, a prediction review screen 1001 illustrated in FIG. 10 is displayed. The prediction review screen 1001 illustrated in FIG. 10 is described later. When the link 805 is selected, the recommended function calculation unit 111 executes the process procedure illustrated in FIG. 6 and calculates a recommended function as illustrated in FIG. 8(b).

When the link 806 is selected, the different facility review screen 809 illustrated in FIG. 8(c) is displayed. On the different facility review screen 809, an evaluation of a usage status is quantified and displayed for each facility. In addition, it is possible to display an evaluation of the other facilities in detail by selecting the link 810 of the different facility review screen 809.

Items of the report 803 and the evaluation 804 of the review screen 801 illustrated in FIG. 8(a) are items set in the region 714 and the region 715 illustrated in FIG. 7(a), respectively. The items of the report 803 and the evaluation 804 are not limited to the items set in the region 714 and the region 715 and may be default items.

The report 803 is configured based on the operation information 201 recorded by the operation information recording unit 103. Each item of the report 803 is described below. The number of tests represents the number of samples tested in the range (hereinafter referred to as measurement range) of the operation information 201 set in the pulldown menu 713 or the setting screen 702 by the medical device 102. The number of emergency tests represents the number of emergency samples tested in the measurement range. The number of test items represents the number of types of test items requested in the measurement range. An average TAT represents an average value of a turnaround time for testing all samples in the measurement range. An average operation time (OPS) represents an average daily value of the number of times that the medical device 102 is restarted to perform a preparation operation such as a sample test and cell washing associated with the sample test in the measurement range. The number of days after a maximum maintenance period is exceeded represents the number of days after a maintenance period among maintenance periods of components required to be periodically maintained is most exceeded. An average amount of water consumed represents an average amount of water consumed for a sample test performed once.

The items of the report 803 are an example as a summary report. The items of the report 803 may be changed or an item may be added to the items of the report 803 due to a future update of software. For example, an item of the amount of power used by the medical device 102, and items of the number of alerts and a downtime of the medical device 102 based on the operation information can be added when the user requests the items.

The evaluation 804 illustrated in FIG. 8 is a graphical radar chart calculated based on the operation information 201 recorded by the operation information recording unit 103. The radar chart includes an evaluation value of each item and a total value of the evaluation values. Although the evaluation 804 can be displayed using only numerical values, the graphical radar chart is provided such that the user intuitively easily recognizes the usage status of the medical device. The radar chart includes, for example, five items of an operating rate, TAT efficiency, environmental efficiency, a normal operation level, and operation efficiency. A maximum score of each item is 20 points, a minimum score of each item is 0 point, and the total of scores is up to 100 points. Since the total of the scores is adjusted to 100 points, the maximum score of each item varies internally according to the number of items. When the score of each item is higher than the maximum score or lower than 0 point, it is rounded down. For example, a method of calculating a value of each item is as follows.

The operating rate represents a percentage of time during when the medical device 102 is operated to analyze a sample in the measurement range. As an example of the calculation method, a method of dividing a time during which the medical device 102 operates to perform analysis on each measurement day by a recommended analysis time per day. In this case, the recommended analysis time per day is set as a fixed value that is an approximate time for which the medical device 102 operates to perform analysis per day. For example, in a case where an average daily usage time is 6 hours, when it is assumed that the recommended analysis time is 7 hours, the score of this item is calculated as 20×6/7=17 points (rounded down to the nearest whole number). In a case where the recommended analysis time is 7 hours and the score is 20 points or more, the score is rounded down to the nearest whole number. However, the score may be up to 20 points for 24 hours.

The TAT efficiency represents the efficiency of a turnaround time (TAT) required for a test. The TAT required for the test is assumed to be a time from introduction of a sample into the medical device 102 to output of a result of the test. A time period from when blood is collected from a patient to when a test result is reported to the patient may be defined as a TAT for a test. As an example of the calculation method, there is a method of calculating it based on a value obtained by dividing a value obtained by subtracting a minimum TAT from an average TAT by a value obtained by subtracting the minimum TAT from a maximum allowable TAT. The average TAT is an average value of a turnaround time for testing one or more samples analyzed in a measurement period. The minimum TAT is set as a fixed value that is the minimum time required for a sample test. The maximum allowable TAT is set as a fixed value that is the maximum time required for the sample test. For example, when the average TAT is 15 minutes based on the operation information, and it is assumed that the minimum TAT is 10 minutes and the maximum allowable TAT is 30 minutes, a score of this item can be calculated as 20×(1−(15−10)/(30−10))=15 points.

The operation efficiency represents an index to use the device efficiently with fewer operations. As an example of the calculation method, there is a method of calculating it based on a value obtained by dividing a value obtained by subtracting 1 from the average OPS (number of times that the operation is started) by a value obtained by subtracting 1 from the maximum OPS. In this case, the average OPS is an average value of the numbers of times that the operation is started in a day in the measurement period. The maximum OPS is set as a fixed value that is the allowable number of times that the operation is started per day. For example, when the average OPS is 3 times based on the operation information, and it is assumed that the maximum OPS is 5 times, a score of this item can be calculated as 20×(1−(3−1)/(5−1))=10 points (rounded down to the nearest whole number).

The normal operation level represents that maintenance of the device is normally performed. As an example of the calculation method, there is a method of calculating it based on a value obtained by dividing a value obtained by subtracting the number of days after a maintenance period is exceed from the maintenance period by the maintenance period. For example, when it is assumed that maintenance periods of components A and B are one month, the maintenance period of the component A is exceeded by one day, and the maintenance period of the component B is exceeded by 2 days, a score of this item can be calculated as 20× (30−1)/(30× (½)+20× (30−2)/30× (½)=19 points.

The environmental efficiency represents a resource consumed and the efficiency with which a test could be performed with the resource. There is a method of calculating it based on a value obtained by dividing a value obtained by subtracting the minimum amount of water used to test one sample from an average amount of water consumed for one sample in a measurement period by a value obtained by subtracting the minimum amount of water consumed for one sample from the maximum allowable amount of water consumed for one sample. In this case, the minimum amount of water consumed and the maximum allowable amount of water consumed for one sample are set as fixed values. For example, in a case where the average amount of water consumed is 10 ml, when the minimum amount is 5 ml and the maximum allowable amount is 30 ml, a score of this item can be calculated as 20×(1−(10−5)/(30−5))=16 points.

The description relating to each item and the methods of calculating the values can be displayed as a pop-up display by selecting each item name of the radar chart.

An evaluation value calculated for each item is displayed as each value of the radar chart of the evaluation 804. The total of the values is displayed as a numerical value at the center of the radar chart. For example, the total of the scores described above that is 77(=17+15+10+19+16) points is displayed at the center of the radar chart.

The items of the evaluation 804 described above and the methods of calculating the items are an example. The items may be changed and an item may be added due to a future update of software. For example, an item with high cost-effectiveness calculated based on the operational cost of the medical device 102 and a benefit gained from a test can be added when the user requests the item. The item of the environmental efficiency is not limited to the amount of water and can be replaced with an amount of power consumed and calculated.

Next, a process procedure to be executed by the evaluation calculation unit 112 is described with reference to FIG. 9. The process procedure illustrated in FIG. 9 is started in accordance with selection of the Run button 724 illustrated in FIG. 7(*b*). The evaluation calculation unit 112 refers to the operation information 201 stored by the operation information recording unit 103 and extracts operation information in a measurement range (S901). Next, the evaluation calculation unit 112 classifies the extracted operation information into the items of the report 803 and aggregates the items (S902). The evaluation calculation unit 112 outputs a result of the aggregation as the report 803 (S903). Next, the evaluation calculation unit 112 uses the above-described equations to calculate evaluation values of the items from the operation information 201 (S904). In addition, the evaluation calculation unit 112 also calculates the total of the evaluation values of the items (S905). Then, the evaluation calculation unit 112 outputs the radar chart and numerical values as in the evaluation 804 (S906). The evaluation calculation unit 112 supports reviewing the operation method of the medical device 102 and considering adopting the functions included in the medical device 102 by visualizing a review of the usage status of the medical device 102.

Prediction Review of Usage Status When Recommended Function is Applied

FIG. 10 illustrate a screen indicating a review of the usage status when a function recommended by the recommended function calculation unit is applied, and the like. FIG. 10(*a*) illustrates a prediction review screen indicating a prediction review of the usage status when a recommended function is applied. FIG. 10(*b*) illustrates a screen indicating operation information matching a usage condition for the recommended function. FIG. 10(*c*) is a diagram indicating a manual for the recommended function.

The evaluation calculation unit 112 calculates, based on the operation information 201 in a specified range, a prediction review of the usage status when the recommended function (function A in FIG. 10) is applied to the medical device 102. The prediction review screen 1001 illustrated in FIG. 10(*a*) includes a time period display region 1002 for displaying the specified range of the operation information 201, and a report 1003 indicating details of the operation of the medical device 102 for set report items. In addition, the prediction review screen 1001 includes an evaluation 1004 displaying an evaluation calculated by the evaluation calculation unit 112 based on the operation information 201 by using a graphical radar chart. Parts of the time period display region 1002, the report 1003, and the evaluation 1004 that are common to the time period display region 802, the report 803, and the evaluation 804 will not be described as appropriate. It is possible to check an effect obtained when a recommended function is applied in the latest operation status by specifying a range of the operation information 201, for example, by specifying the latest operation information.

In the report 1003, a marker 1009 is provided for an item with an effect and a numerical value such that the value with the effect when the function A is applied is highlighted, as compared with the report 803 illustrated in FIG. 8. In the evaluation 1004, the radar chart with a changed item is displayed overlapping the radar chart illustrated in FIG. 8 such that the user can recognize a value of the evaluation item changed when the function A is applied, as compared with the evaluation 804 illustrated in FIG. 6. In a radar chart 1010 illustrated in FIG. 10, an evaluation when the function A is applied is indicated by a solid line, and an evaluation before the function A is applied is indicated by a dotted line. In addition, regarding the total evaluation value, the total point ("87" in FIG. 10) when the function A is applied is displayed. By displaying the two evaluations in comparison with each other, the user can compare both evaluations and determine whether to apply a recommended function to the medical device 102.

The prediction review screen 1001 includes a link 1005 for checking a case where a recommended function is used, and a link 1006 for checking a manual describing how to use the recommended function. When the link 1005 is selected, a screen 1007 for checking one or a plurality of cases where the recommended function is used is displayed. On the screen 1007, a time of day and operation information 201 that match a usage condition for the function A are displayed for each of the cases. In addition, when the link 1006 is selected, a manual 1008 indicating a method of using the recommended function is displayed. In a case where the manual is stored in the cloud 107 or another device, the manual is downloaded from the cloud 107 or the other device via the network.

A prediction review of the usage status when the rack reception function is applied as the function A is described below. On the review screen 801 before the rack reception function is applied, the item of the average OPS of the report 803 is 3 times, and the item of the operation efficiency of the evaluation 804 is 10 points. The total value of the evaluation 804 is 77 points. When the rack reception function is applied to this result, the item of the average OPS of the report 1003 changes from 3 times to 1 time on the prediction review screen 1001 due to an effect of the rack reception function. In addition, the item of the operation efficiency of the evaluation 1004 is 20× (1-(1-1)/(5-1))=20 points. Then, the total value of the evaluation 1004 is 87 points.

Reviews of Usage Statuses of Anther Facility

FIG. 11 illustrate a screen indicating a review of a usage status of another facility calculated by the similar facility calculation unit, and the like. FIG. 11(a) illustrates a review screen 1101 indicating the review of the usage status of the other facility. FIG. 11(b) illustrates a checking screen 1106 for checking settings of the other facility and the medical device 102.

The similar facility calculation unit 113 calculates the reviews of the usage statuses of the medical device of the other facility based on operation information 201 in a specified range. The review screen 1101 illustrated in FIG. 11(a) indicates a review of a usage status of a medical device of the facility A. The review screen 1101 illustrated in FIG. 11(a) includes a time period display region 1102 for displaying the specified range of the operation information 201, and a report 1103 indicating details of the operation of the medical device of the other facility for set report items. In addition, the review screen 1101 includes an evaluation 1104 for displaying an evaluation calculated by the similar facility calculation unit 113 based on the operation information 201 as a graphical radar chart. Furthermore, the review screen 1101 includes a link 1105 for checking settings of the medical device 102 and the other facility calculated by the similar facility calculation unit 113 in comparison with each other. The time period display region 1102, the report 1103, and the evaluation 1104 are similar to the time period display region 802, the report 803, and the evaluation 804 illustrated in FIG. 8(a), respectively, and thus will not be described.

When the link 1105 is selected, the checking screen 1106 illustrated in FIG. 11(b) is displayed. On the checking screen 1106, settings of functions used by the medical device 102 and the medical device of the facility A are displayed in comparison with each other. A mark 1107 is given to different details of the settings such that the different details are highlighted. By giving the marker 1107, the user can easily recognize different settings. On the checking screen 1106, it is possible to select a desired function on a checkbox 1108, check details of setting of the selected function, check a prediction review when the selected function is applied, and apply the selected function to the medical device of the other facility. Since the similar facility calculation unit 113 can output a review of the other facility, the user of the medical device 102 can refer to a function and the like used by a highly evaluated facility, and select a function to be applied to the medical device 102 or a function not to be applied to the medical device 102.

When the link 806 illustrated in FIG. 8(a) is selected, the similar facility calculation unit 113 executes a process procedure illustrated in FIG. 12, and calculates a review of the usage status of the medical device of the other facility. The similar facility calculation unit 113 is connected to the cloud 107 via the network. The similar facility calculation unit 113 accesses the cloud 107 and acquires operation information 108 of the other facility collected by the cloud 107 (S1201). Thereafter, the similar facility calculation unit 113 checks the type of the medical device of the other facility, and determines whether a device of the same type as the medical device 102 is used (S1202). In a case where a facility in which the device of the same type is used is not present (S1202: No), a review that can be referred to is not present and the process procedure illustrated in FIG. 12 is ended. In a case where a facility in which the device of the same type is used is present (S1202: Yes), the similar facility calculation unit 113 determines whether a facility of which items (for example, the number of samples, the number of emergency samples) as input are approximate in the operation information 108 is present (S1203). In a case where the facility of which the items are approximate is not present (S1203: No), a review that can be referred to is not present and the process procedure illustrated in FIG. 12 is ended. In a case where the facility of which the items are approximate is present (S1203: Yes), the similar facility calculation unit 113 determines whether items (for example, an average operation time, an average TAT for a sample test) as output are excellent, as compared with those of the medical device 102 (S1204). In a case where the excellent items are not present (S1204: No), a review that can be referred to is not present and the process procedure illustrated in FIG. 12 is ended. In a case where the excellent items are present (S1204: Yes), the similar facility calculation unit 113 outputs a review of the usage status of the facility with the approximate items (S1205). Then, the review screen 1101 for a usage status of a similar facility is displayed on the display unit 340.

A plurality of medical devices of different types may operate in a single facility. In such a case, operation information and function information of the medical devices differ, but the calculation unit 105 can evaluate a usage status of each of the medical devices. In addition, the calculation unit 105 can individually present a recommended function to each of the medical devices.

In addition, in a case where the medical devices are of the same type, it is possible to integrate the operation information of the plurality of medical devices and recommend a function for optimizing the usage statuses of the plurality of medical devices. For example, an average TAT of the operation information of the medical devices of the same type is referred to, and it is assumed that the average TAT of each of the medical devices is largely biased. In this case, the recommended function calculation unit 111 can recommend a function to instruct the user to allocate a sample to the medical devices such that an average value of the plurality of medical devices is small.

Example 2

Figure 13:
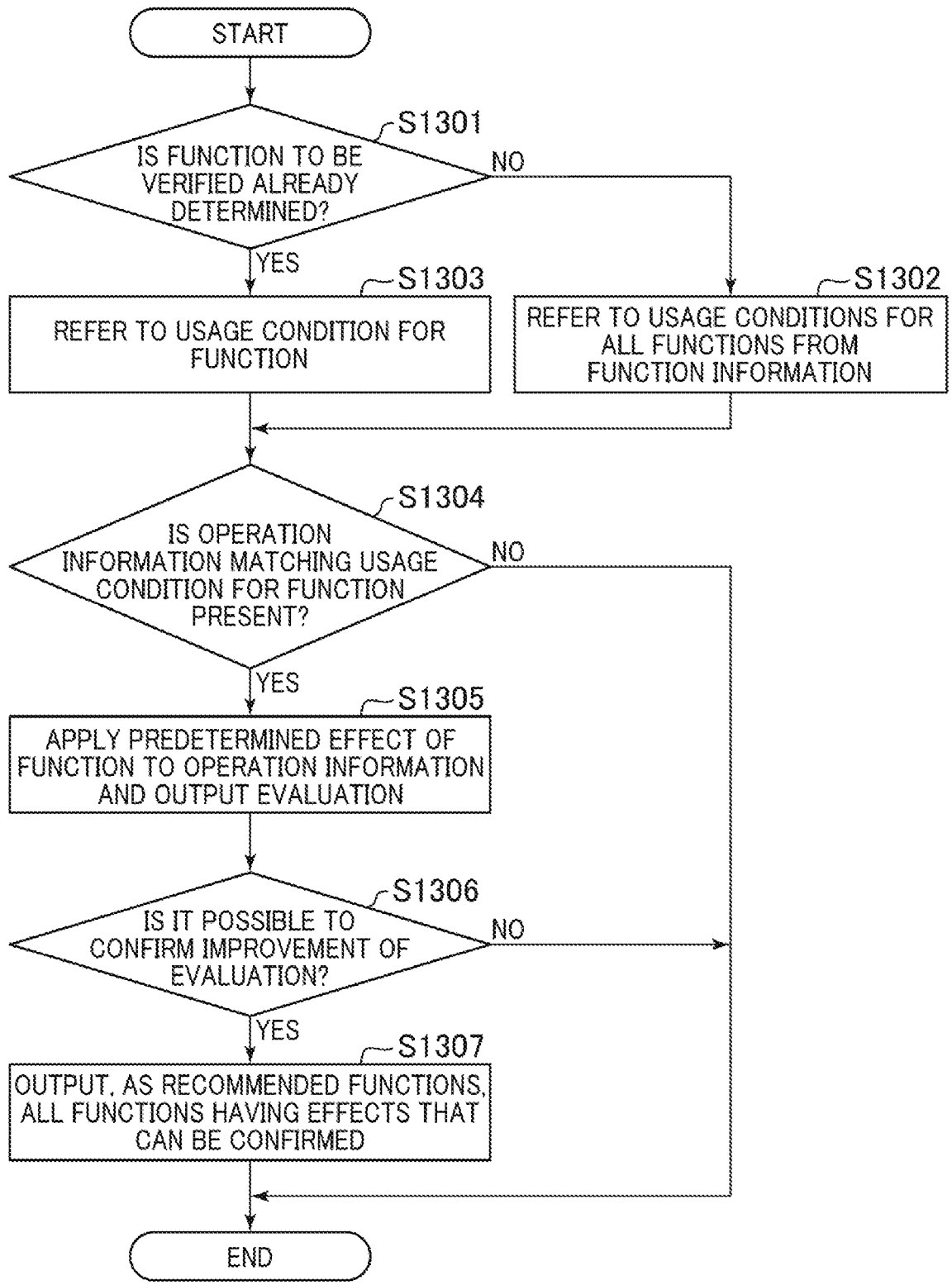
FIG. 13 illustrates a process procedure to be executed by a recommended function calculation unit according to Example 2.

FIG. 13 illustrates a process procedure to be executed by a recommended function calculation unit according to Example 2. The recommended function calculation unit 111 according to Example 2 outputs a recommended function in a case where an overall evaluation is improved. Configurations other than the recommended function calculation unit 111 and an evaluation calculation unit 112 are similar to those described in Example 1, and thus will not be described.

The recommended function calculation unit 111 according to Example 2 performs S1301 to S1304 in a similar manner to S601 to S604 described in Example 1. In Example 1, a function for which operation information matches a usage condition is recommended. However, in Example 2, before recommendation of a function, the evaluation calculation unit 112 calculates a review (evaluation 804) of the medical device 102 to which a function matching a usage condition is applied. When the function matching the usage condition is applied to the medical device 102, an evaluation of an item relating to the function matching the usage condition is improved, but an evaluation of other items may be reduced. Therefore, the evaluation calculation unit 112 according to Example 2 calculates the evaluation 804 of the medical device 102 when the function matching the usage condition is assumed to be applied (S1305). Therefore, the user can comprehensively determine the evaluation when the function matching the usage condition is applied to the medical device 102, and determine whether to apply the function matching the usage condition. In Example 2, a total value is calculated as an index when the function matching the usage condition is applied to the medical device 102 (S1305).

The evaluation calculation unit 112 according to Example 2 checks whether the total value of the evaluation 804 has increased from the total value of the evaluation 804 before the function matching the usage condition is applied (S1306). In a case where the total value has not increased (S1306: No), the process procedure illustrated in FIG. 13 is ended. In a case where the total value has increased (S1306: Yes), the recommended function calculation unit 111 outputs a list screen in which the function of which the total value has increased is recommended as in the list screen 807 illustrated in FIG. 8(b).

Next, a case where the rack reception function is recommended is described with reference to the process procedure illustrated in FIG. 13. In the process procedure illustrated in FIG. 13, the recommended function calculation unit 111 refers to a usage condition from the function information 202 of the rack reception function in both cases where the answer is Yes in S1301 and where the answer is No in S1301 (S1302, S1303). The usage condition of the function information 202 is that the device status of the operation history transitions from "preparation" to "analysis" twice or more a day. Next, the recommended function calculation unit 111 crosschecks the usage condition referred to in S1302 or S1303 with the operation information (operation history in this case (see FIG. 2(b)) recorded by the operation information recording unit 103 (S1304). As illustrated in FIG. 2(a), since the operation history of the operation information 201 indicates that the status of the medical device 102 is analysis changed from preparation in the time period from 8:30 to 8:40 and the time period from 13:20 to 13:30, the operation information 201 matches the usage condition for the rack reception function (S1304: Yes).

In a case where the operation information 201 matches the usage condition (S1304: Yes), the evaluation calculation unit 112 outputs an evaluation when the rack reception function is applied (S1305). Since the rack reception function has an effect of reducing the number of times that the operation is started, the evaluation calculation unit 112 reduces the number of times that the operation is started, and calculates an evaluation. For example, the evaluation calculation unit 112 calculates, from an operation history in the measurement range, a virtual average OPS when the number of times that the operation is started matches the usage condition and is reduced. Then, based on the calculated average OPS, the value of the operation efficiency of the evaluation item of the evaluation 804 is calculated and the total value is also calculated. Therefore, the evaluation calculation unit 112 checks whether the total value of the evaluation when the rack reception function is applied has increased from the total value of the evaluation before the rack reception function is applied (S1306).

In a case where the total value has not increased (S1306: No), the process procedure illustrated in FIG. 13 is ended. In a case where the total value has increased (S1306: Yes), the recommended function calculation unit 111 recommends the rack reception function (S1307). The recommended function calculation unit 111 may present the prediction review calculated by the evaluation calculation unit 112 and illustrated in FIG. 10 together with the recommendation of the rack reception function.

In addition, in Example 2, the function is recommended in a case where the total value of the evaluation has increased, but the function may be recommended in a case where it is determined that an evaluation calculated by another method is improved. For example, a weight may be given to each item of an evaluation, a total value may be calculated using an item considered as an important item by the user and prioritized, and a function may be recommended based on the total value.

Example 3

The recommended function calculation unit 111 according to each of Examples 1 and 2 is a software module having its own algorithm implemented therein, but the algorithm implemented may be AI. A recommended function calculation unit 111 according to Example 3 is a trained model formed by a neural network and the trained model outputs a recommended function.

Figure 14:
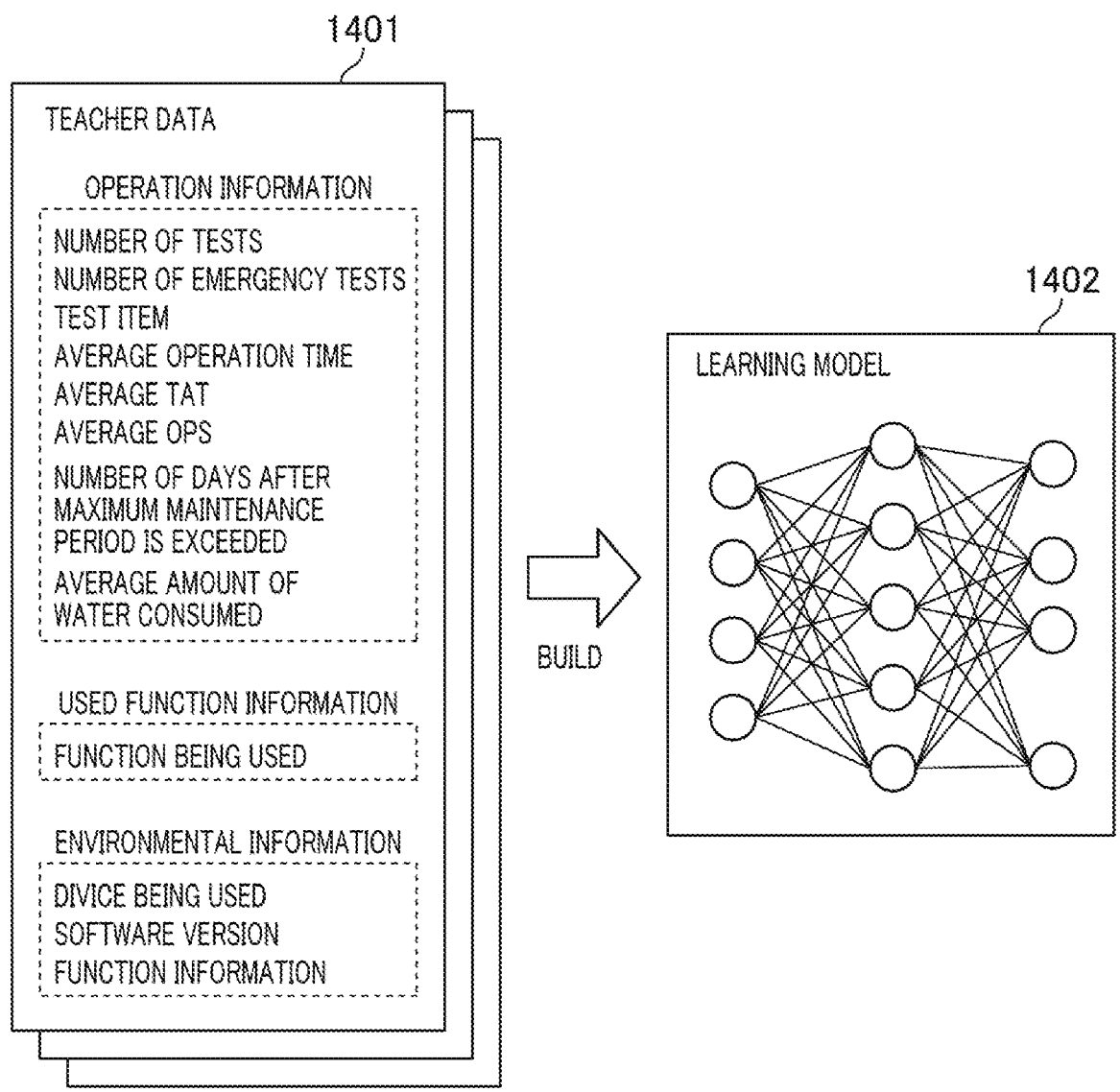
FIG. 14 is a diagram illustrating building of a trained model that outputs a recommended function according to Example 3.

FIG. 14 is a diagram illustrating building of the trained model formed by the neural network and configured to output a recommended function. The trained model 1402 is assumed to be a known neural network and includes an input layer, an intermediate layer, and an output layer. Information input to the input layer is transmitted to the intermediate layer. Processing such as weighting and conversion is subjected to the information received by the intermediate layer. Thereafter, the intermediate layer transmits the processed information to the output layer. The output layer performs processing such as weighting and conversion on the information received from the intermediate layer and outputs a solution as an inference result.

The trained model 1402 illustrated in FIG. 14 is repeatedly trained using teacher data 1401. The teacher data 1401 is data accumulated in the facility in the past, and is data of the other facility collected by the cloud 107. Data with which learning model is trained is only data of an evaluation value exceeding a set threshold among evaluation values calculated by the evaluation calculation unit 112. Therefore, the accuracy of the trained model 1402 depends on the amount of the teacher data 1401 to be used and a level of an evaluation value of each data piece.

The teacher data 1401 includes data such as operation information, used function information, and environment information. The operation information is similar to the operation information described above. The evaluation calculation unit 112 calculates an evaluation value based on the operation information, and the calculated evaluation value also serves as the teacher data 1401. The used function information is information of a function used for an evaluation and setting information of the function. The environment information is information of a type of device used for the evaluation, version information of software, and the function information 202 and 203 illustrated in FIG. 2. The learning model is repeatedly updated by using the operation information and the environment information of the teacher data as input and giving the used function information as output. The trained model 1402 is built by adjusting how to give a weight in the intermediate layer and the output layer using teacher data for a highly evaluated facility.

Figure 15:
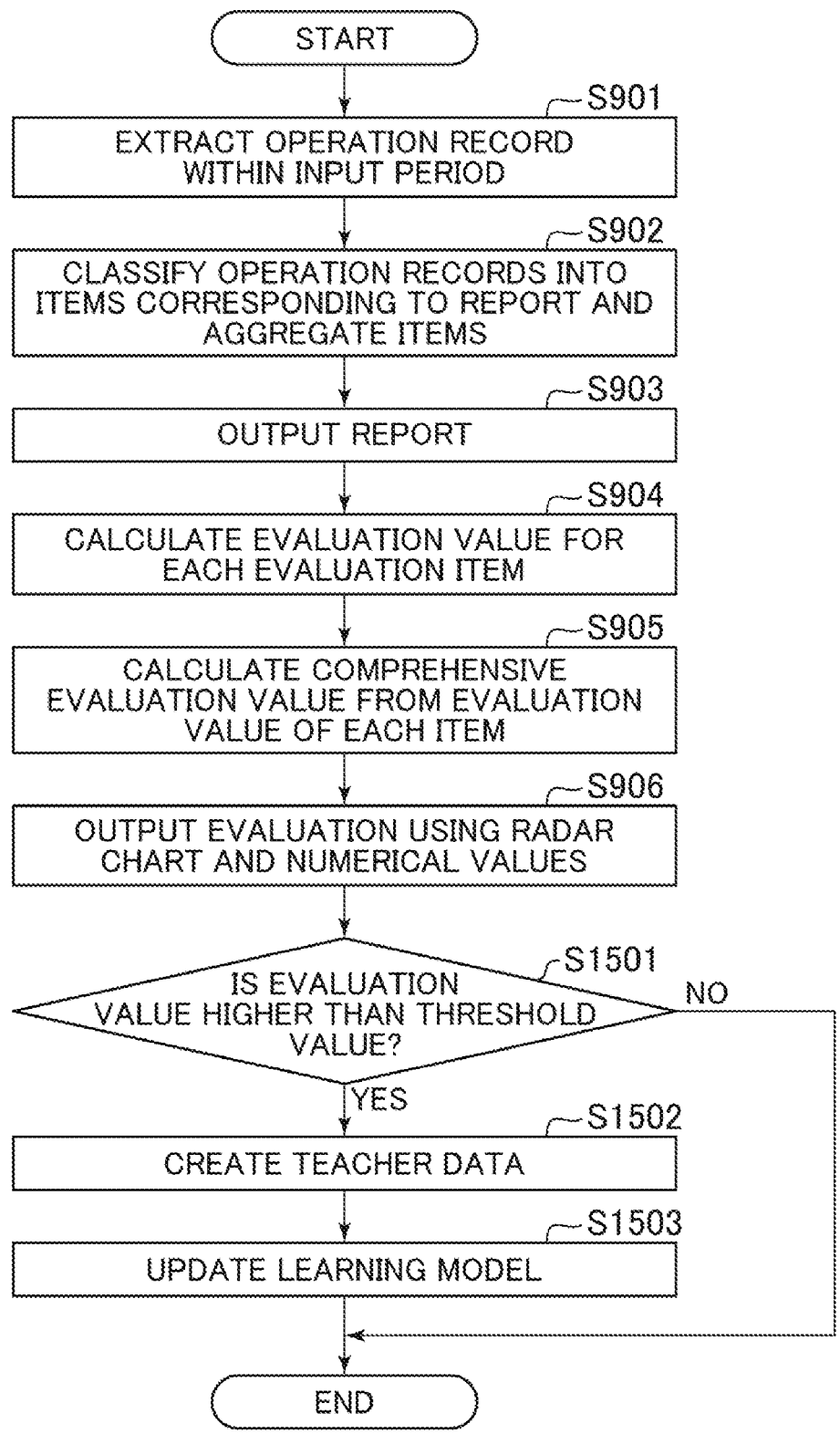
FIG. 15 illustrates a procedure for building the trained model according to Example 3.

FIG. 15 illustrates a procedure for building the learning model. This building procedure is processing to be performed after S906 of the process procedure illustrated in FIG. 9 described above. The evaluation calculation unit 112 calculates an evaluation value from the operation information and compares the evaluation value with a threshold set in advance (S1501). In a case where the evaluation value is higher than the threshold (S1501: Yes), the evaluation calculation unit 112 creates teacher data (S1502). In a case where the evaluation value is lower (S1501: No), the building procedure illustrated in FIG. 15 is ended. The above-described threshold may be a value arbitrarily set by the user or may be a top percent value held on the system side. The evaluation calculation unit 112 creates the teacher data by collecting the used function information and the environment information illustrated in FIG. 14, in addition to the operation information used for the evaluation (S1502). After that, the evaluation calculation unit 112 updates the learning model using the teacher data (S1503). The procedure for building the learning model is not only executed when the user explicitly performs evaluation calculation but also periodically automatically executed in a background. In addition, it is desirable that the teacher data and the learning model be periodically uploaded to the cloud 107 after the creation and update of the trained model.

Figure 16:
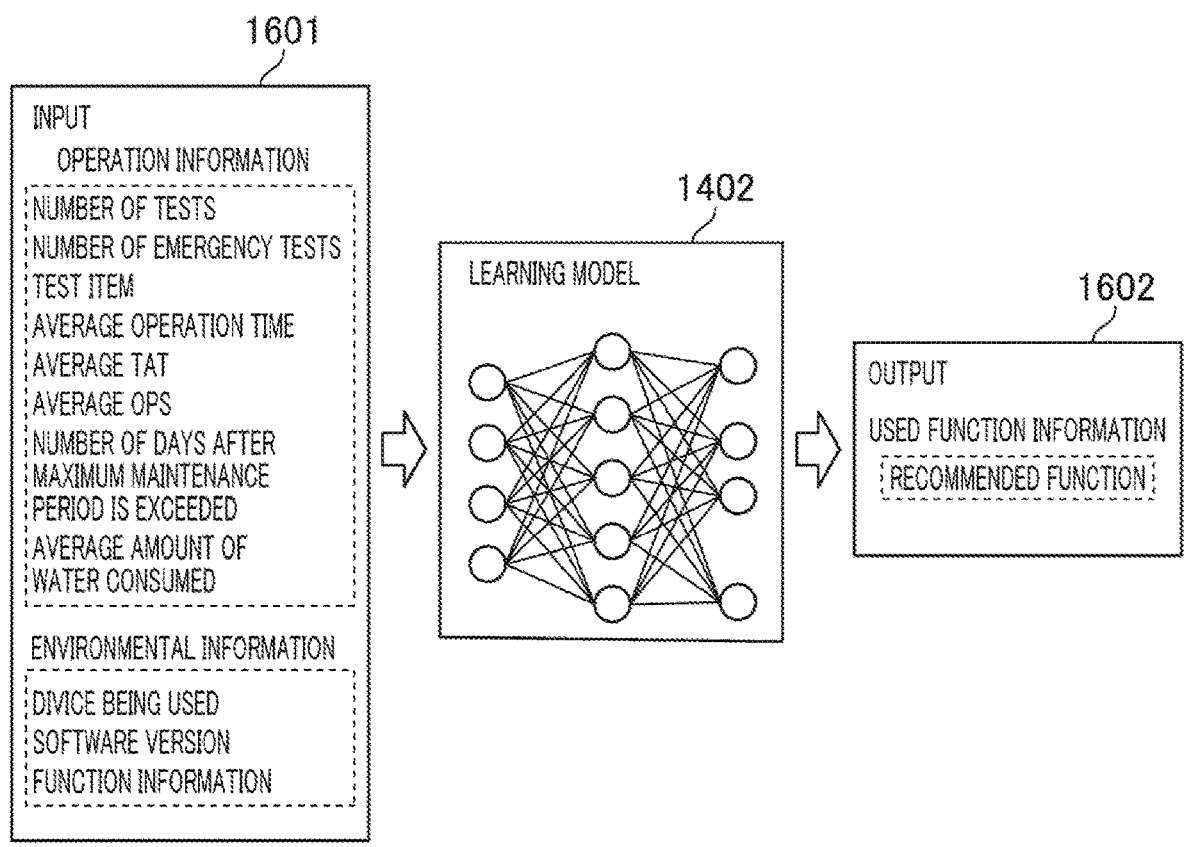
FIG. 16 is a diagram illustrating the trained model that outputs a recommended function according to Example 3.

FIG. 16 is a diagram illustrating the trained model that outputs a recommended function. Operation information and environment information of a facility are input as input 1601, and a recommended function is output as output 1602.

Figure 17:
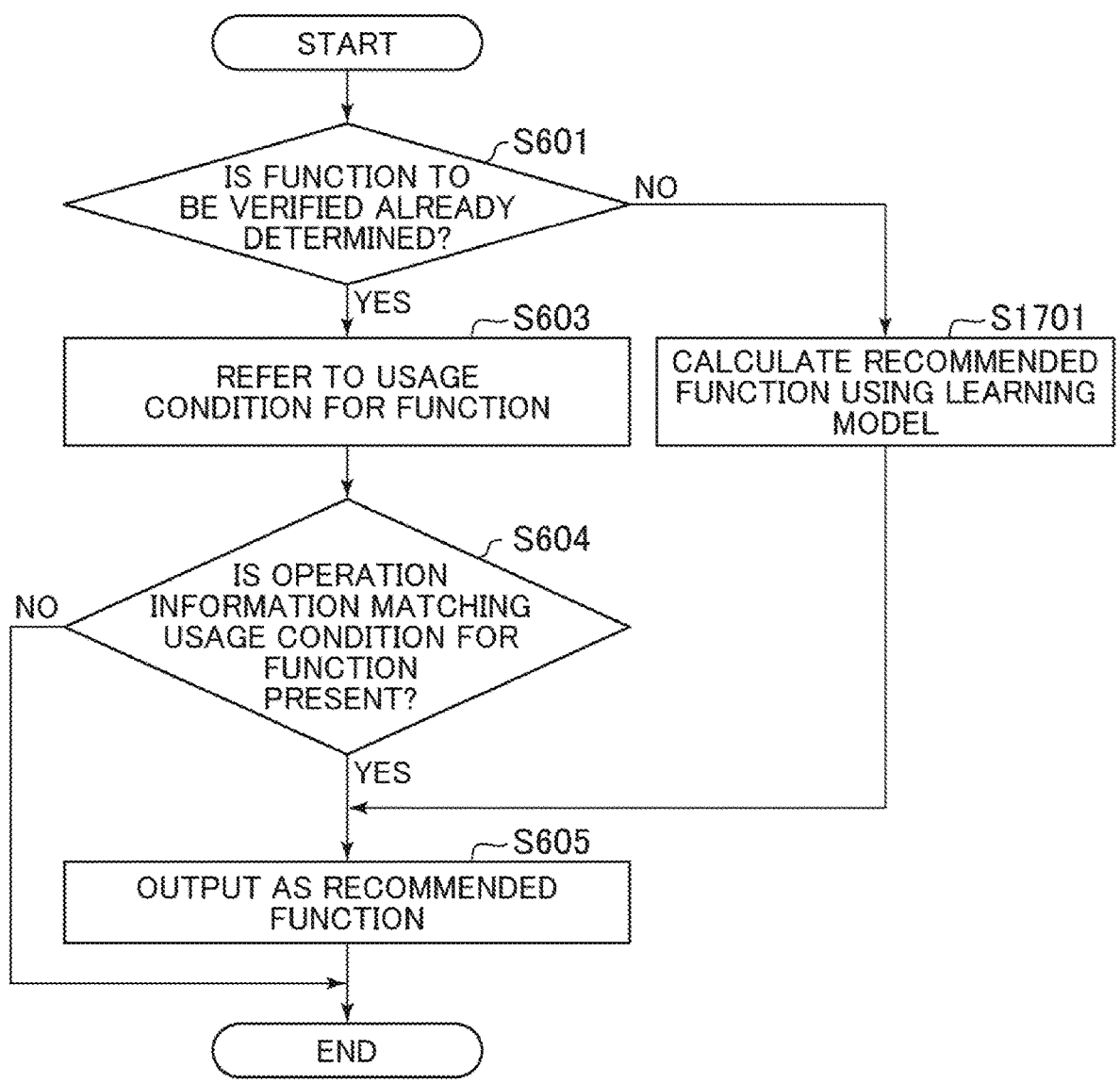
FIG. 17 illustrates a process procedure in which the trained model outputs a recommended function according to Example 3.

FIG. 17 is a process procedure in which the trained model outputs a recommended function. The process procedure illustrated in FIG. 17 is similar to the process procedure illustrated in FIG. 6. As a different feature, in S602 in FIG. 6, usage conditions for all functions are referred to from the function information, and a function to be recommended later is searched. Meanwhile, in S1701 in FIG. 17, the trained model outputs a recommended function. By using the trained model, it is possible to output, as a recommended function, a function that matches a usage status of a facility and can be expected to improve an evaluation.

Example 4

Figure 1B:
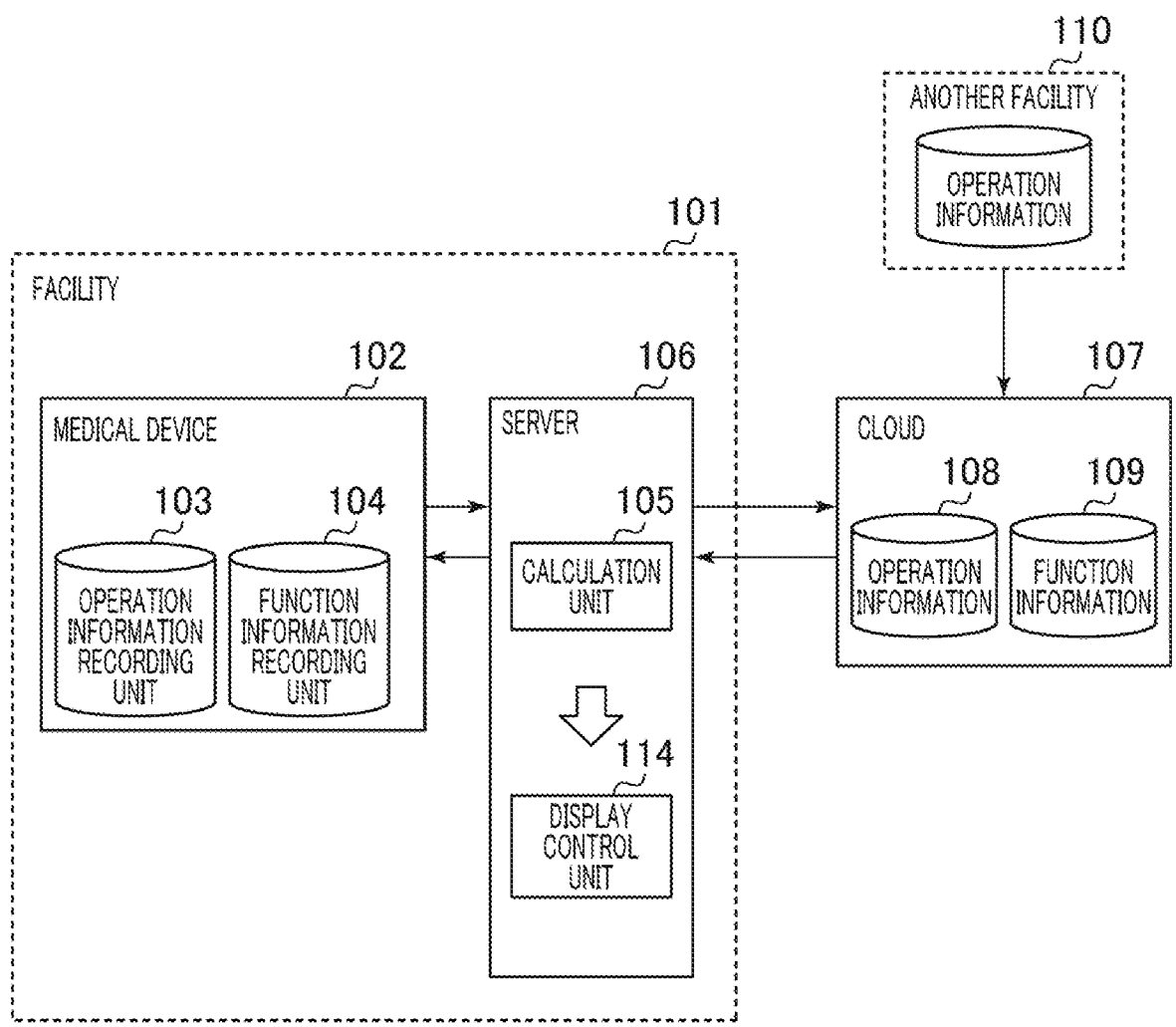
FIG. 1B is a diagram illustrating an overall configuration of a function recommendation system according to Example 4.

In Example 1, the medical device 102 includes the calculation unit 105. However, the calculation unit 105 may not be present in the medical device 102. In Example 4, as illustrated in FIG. 1B, a server 106 installed in the facility 101 includes a calculation unit 105 including a recommended function calculation unit 111, an evaluation calculation unit 112, and a similar facility calculation unit 113. Then, the display control unit 114 of the server 106 displays various screens on a display unit connected to the server 106 or the display unit of the medical device 102. That is, in Example 4, the on-premise server 106 includes the calculation unit 105 and the display control unit 114.

Example 5

Figure 1C:
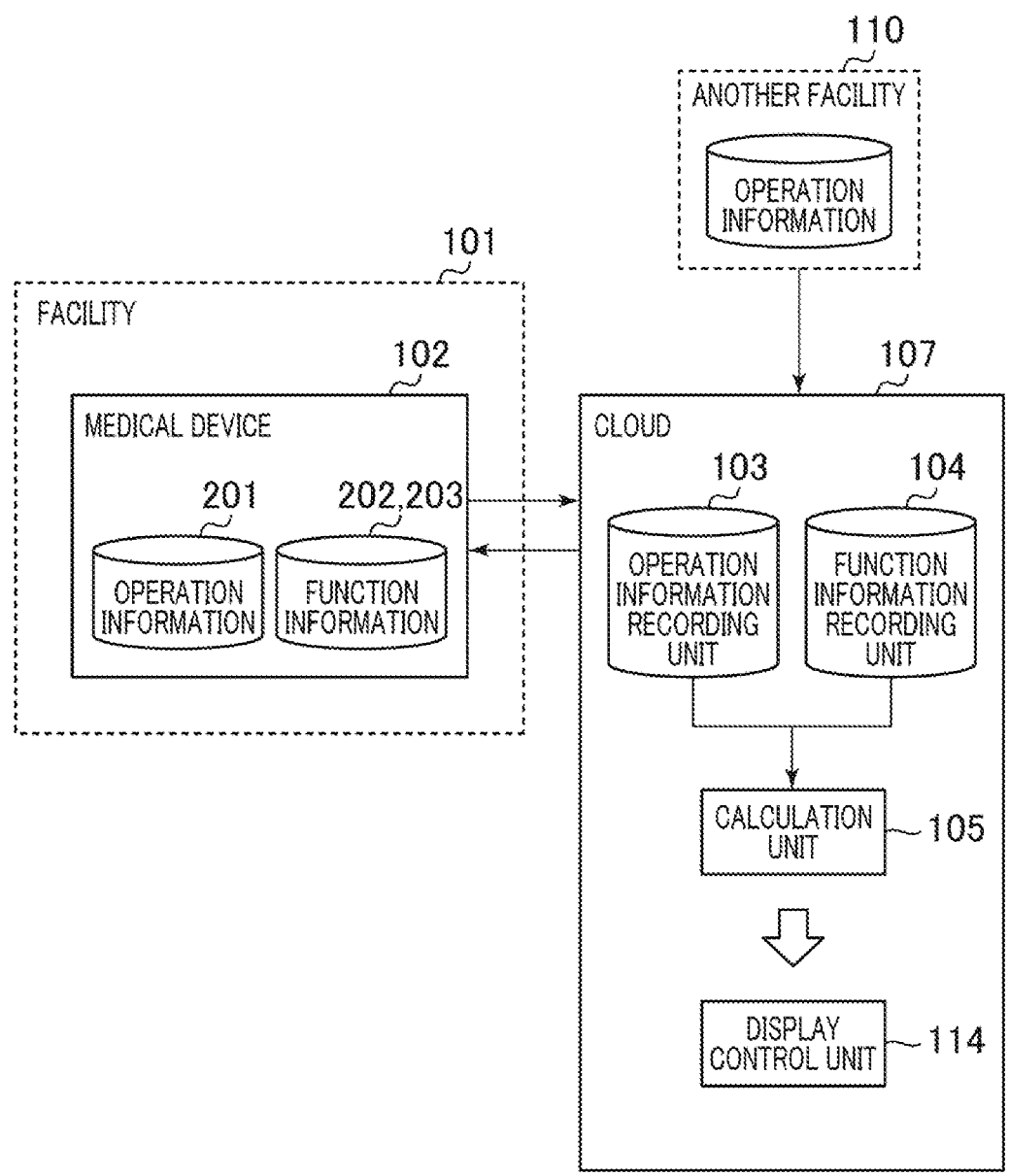
FIG. 1C is a diagram illustrating an overall configuration of a function recommendation system according to Example 5.

Although the on-premise server 106 includes the calculation unit 105 in Example 4, the calculation unit 105 may be installed in the cloud 107. As illustrated in FIG. 1C, the calculation unit 105 is not installed in the facility 101, and the cloud 107 includes the calculation unit 105. In addition, the cloud 107 includes the operation information recording unit 103 that receives and records the operation information 201 received from the medical device 102, and the function information recording unit 104 that receives and records the function information 202 and 203 received from the medical device 102. The display control unit 114 of the cloud 107 displays various screens on a display unit connected to the cloud 107 or the display unit of the medical device 102.

The present invention is not limited to the above-described Examples and includes various modifications. The abovementioned Examples are described in detail to clearly explain the present invention, and are not necessarily limited to the examples including all the configurations described.

In addition, a part of a configuration described in a certain Example can be replaced with a configuration described in another Example. Furthermore, a configuration described in a certain Example can be added to a configuration described in another Example. In addition, for a part of the configuration described in each Example, addition, removal, and replacement of another configuration can be made.

LIST OF REFERENCE SIGNS

1: function recommendation system
101: facility
102: medical device
103: operation information recording unit
104: function information recording unit
105: calculation unit
107: cloud
108: operation information
109: function information
110: another facility
111: recommended function calculation unit
112: evaluation calculation unit
113: similar facility calculation unit
114: display control unit
201: operation information
202: function information
203: function information
310: conveyance unit
320: processing unit 330: control unit
331: processor
332: communication I/F
333: main storage device
334: auxiliary storage device
335: input/output I/F
336: bus
340: display unit
401: processor
402: communication I/F
403: main storage device
404: auxiliary storage device
405: input/output I/F
406: bus
1401: teacher data
1402: trained model

The invention claimed is:

1. A function recommendation system, comprising:
an automatic analyzer that analyzes biological samples having a plurality of cells holding at least one of the samples;
a processor coupled to the automatic analyzer; and
a memory, the memory storing instructions, that when executed, configure the processor to:
store operation information indicating an operation status of the automatic analyzer;
store function information including one or more usage conditions for determining whether to recommend a function corresponding to the function information to be automatically executed by the automatic analyzer,
periodically and automatically determine whether the operation information of the automatic analyzer satisfies the one or more usage conditions and upon determining the operation information satisfies the one or more usage conditions, output the function corresponding to the function information as a recommended function, and automatically cause the automatic analyzer to execute the recommended function,
wherein the function as the recommended function is a stop washing function of reducing water used during cell washing.

2. The function recommendation system according to claim 1, further comprising:
a display coupled to the processor,
wherein the processor is configured to cause the display to display the recommended function.

3. The function recommendation system according to claim 1,
wherein the operation information includes at least one of a usage history of a consumable used by the automatic analyzer, test request information indicating a detail of a request for a test to be performed by the automatic analyzer, a test result of the test performed by the automatic analyzer, a turnaround time required for the test performed by the automatic analyzer, an operation history of the automatic analyzer, an event history of an event that occurred in the automatic analyzer, an alarm history of an alarm that occurred in the automatic analyzer, system setting information of the automatic analyzer, an operation time of the automatic analyzer, a replacement timing and a usage time of a component of the automatic analyzer, and amounts of water and electricity consumed by the automatic analyzer.

4. The function recommendation system according to claim 1,
wherein a function and new function information corresponding to a usage condition for recommending the function are acquired from an external device via a network.

5. The function recommendation system according to claim 1,
wherein the processor is configured to output a usage status of the automatic analyzer as graphical information based on the operation information.

6. The function recommendation system according to claim 1,
wherein the processor is configured to output, as graphical information, an effect obtained when the recommended function is applied to the automatic analyzer.

7. The function recommendation system according to claim 6,
wherein the processor is configured to:
compare the effect obtained when the recommended function is applied to the automatic analyzer with an evaluation of a usage status of the automatic analyzer to which the recommended function is not applied, and
output a result of the comparison.

8. The function recommendation system according to claim 6,
wherein the processor is configured to:
use the operation information in a specified measurement range to compare an effect obtained when the recommended function in the measurement range is applied to the automatic analyzer an evaluation of a usage status of the automatic analyzer in the measurement range when the recommended function is not applied, and
output a result of the comparison.

9. The function recommendation system according to claim 5,
wherein the processor is configured to:
output, for each of a plurality of items, an evaluation of the automatic analyzer to which the recommended function is applied, and
automatically set the recommended function in the automatic analyzer based on the plurality of evaluations.

10. The function recommendation system according to claim 5,
wherein the processor is configured to output, based on the operation information, a report including at least one of items of a number of tests, a number of emergency tests, a number of test items, an average operation time, an average turnaround time (TAT), an average operation time, a number of days after a maximum maintenance period is exceeded, and an average amount of water consumed as a detail of the usage status of the automatic analyzer.

11. The function recommendation system according to claim 5,
wherein the processor is configured to output, based on the operation information, an evaluation including at least one of items of an operating rate, operation efficiency, a normal operation level, environmental efficiency, and turnaround time (TAT) efficiency as an evaluation of the usage status of the automatic analyzer.

12. The function recommendation system according to claim 1,
wherein the processor is configured to output a usage status of an automatic analyzer of the same type as the automatic analyzer as graphical information.

13. A function recommendation method, comprising the steps of:

providing an automatic analyzer that analyzes biological samples having a plurality of cells holding at least one of the samples;

storing operation information indicating a usage status of the automatic analyzer;

storing function information including one or more usage conditions for determining whether to recommend a function corresponding to the function information to be automatically executed by the automatic analyzer; and periodically and automatically determining whether the operation information of the automatic analyzer satisfies the one or more usage conditions and upon determining the operation information satisfies the one or more usage conditions, outputting the function corresponding to the function information as a recommended function, and automatically cause the automatic analyzer to execute the recommended function, wherein the function as the recommended function is a stop washing function of reducing water used during cell washing.

* * * * *